(12) United States Patent
Moe

(10) Patent No.: US 11,641,849 B2
(45) Date of Patent: May 9, 2023

(54) CUSTOMIZABLE FISHING LURES AND KIT FOR MAKING THE SAME

(71) Applicant: Stephan Moe, Agoura Hills, CA (US)

(72) Inventor: Stephan Moe, Agoura Hills, CA (US)

(73) Assignee: Stephen Moe, Agoura Hills, CA (US)

( * ) Notice: Subject to any disclaimer, the term of this patent is extended or adjusted under 35 U.S.C. 154(b) by 247 days.

(21) Appl. No.: 16/886,760

(22) Filed: May 28, 2020

(65) Prior Publication Data

US 2020/0375164 A1 Dec. 3, 2020

Related U.S. Application Data

(63) Continuation-in-part of application No. 29/692,744, filed on May 28, 2019, now Pat. No. Des. 934,984, and a continuation-in-part of application No. 29/692,748, filed on May 28, 2019, now Pat. No. Des. 934,986, and a continuation-in-part of application No. 29/692,746, filed on May 28, 2019, now Pat. No. Des. 934,985.

(60) Provisional application No. 62/853,650, filed on May 28, 2019.

(51) Int. Cl.
*A01K 85/16* (2006.01)
*A01K 85/01* (2006.01)

(52) U.S. Cl.
CPC .............. *A01K 85/16* (2013.01); *A01K 85/01* (2013.01)

(58) Field of Classification Search
CPC ................................. A01K 85/01; A01K 85/16
USPC ........................................................... 43/42
See application file for complete search history.

(56) References Cited

U.S. PATENT DOCUMENTS

| | | | |
|---|---|---|---|
| 1,788,674 A | | 1/1931 | Hughes |
| 3,935,660 A | * | 2/1976 | Plew ....................... A01K 85/01 43/42.31 |
| 4,199,888 A | * | 4/1980 | Barnes ................... A01K 95/00 43/42.34 |
| 4,418,490 A | | 12/1983 | Ancona |
| 4,638,584 A | * | 1/1987 | Lindsay ................. A01K 85/01 43/42.31 |
| 4,638,586 A | * | 1/1987 | Hall ....................... A01K 85/00 43/42.26 |
| D309,977 S | | 8/1990 | Whittier |
| 5,131,180 A | | 7/1992 | Ives |
| 5,517,783 A | | 5/1996 | Edgar |

(Continued)

OTHER PUBLICATIONS

Notice of Allowance dated Jun. 30, 2021 for U.S. Appl. No. 29/692,744 (pp. 1-9).

(Continued)

*Primary Examiner* — Brady W Frazier
(74) *Attorney, Agent, or Firm* — Ferguson Case Orr Paterson LLP

(57) ABSTRACT

Devices and designs for use in customizable and reusable fishing lure system. In some embodiments, devices include a base lure body and at least one lure cover which is applied to the lure body, for example, by using a shrink-wrap technique. The lure covers may include modifications, e.g., cuts or slits to provide a desired visual or movement effect. Other embodiments may include additional decorative or functional elements, such as a tail piece, a scent pad, or the like. In some embodiments, the lure cover may also be coated with various substances to attract fish by scent or visual effect. The lure covers and elements may be designed to mimic certain types of bait.

20 Claims, 25 Drawing Sheets

(56) References Cited

U.S. PATENT DOCUMENTS

| | | | | |
|---|---|---|---|---|
| D373,244 S | | 9/1996 | Hackman | |
| 6,000,932 A | * | 12/1999 | Willet | A01K 85/16 431/356 |
| 6,185,859 B1 | * | 2/2001 | Pirkle | A01K 85/00 24/129 B |
| 6,393,757 B2 | * | 5/2002 | Bomann | A01K 85/00 43/42.24 |
| 6,647,660 B1 | * | 11/2003 | Kruger | A01K 85/18 43/42.53 |
| 7,694,453 B1 | * | 4/2010 | Arrico | A01K 85/02 43/42.42 |
| D663,378 S | | 7/2012 | Osman | |
| 8,627,594 B1 | * | 1/2014 | Weron | A01K 85/16 43/42.32 |
| D709,589 S | | 7/2014 | Zebny | |
| 9,078,420 B1 | * | 7/2015 | Rudy | A01K 85/00 |
| D783,120 S | | 4/2017 | Martin | |
| D846,692 S | | 4/2019 | Bryan | |
| D856,006 S | | 8/2019 | Kuncaitis | |
| D891,102 S | | 7/2020 | Rich | |
| 2006/0016118 A1 | * | 1/2006 | Zuk | A01K 85/18 43/43.12 |
| 2006/0213112 A1 | * | 9/2006 | Caillouet | A01K 85/08 43/42.25 |
| 2007/0199233 A1 | * | 8/2007 | Higgin | A01K 85/16 43/42.31 |
| 2007/0220798 A1 | * | 9/2007 | Davidson | A01K 91/20 43/43.12 |
| 2009/0000177 A1 | * | 1/2009 | Johnson | A01M 31/06 43/42.32 |
| 2014/0311010 A1 | * | 10/2014 | Talbot | A01K 85/16 43/42.06 |
| 2018/0007881 A1 | | 1/2018 | Downey | |

OTHER PUBLICATIONS

Bass Pro Shops Rig Wrapper . . . https://www.basspro.com/shop/en/bass-pro-shops-rig-wrapper?hvarAID=shopping_googleproductextensions&ds_e=GOOGLE&ds_c=Shop%7CBPS%7CTopPerformers%7CFishing&gclid=EAlalQobChMlqqPGmu6f8QIVwgi_ICR22PwaAEAQYASABEgLXmfD_BwE&gclsrc=aw.ds (Year: 2013).

Kylebooker Packs Fishing Lure Wraps Clear PVC Protective Covers . . . https://www.amazon.com/Kylebooker-Fishing-Protective-Covers-Medium/dp/B08RZ1BX7Z/ref=asc_df_B08RZ1BX7Z/?tag=hyprod-20&linkCode=df0&hvadid=507909744693&hvpos=&hvnetw=g&hvrand=15655396966658517093&hvpone=&hvptwo=&hvqmt=&hvdev=c&hvdvcmdl=&.

Notice of Allowance dated Jun. 30, 2021 for U.S. Appl. No. 29/692,748 (pp. 1-9).

Notice of Allowance dated Jul. 1, 2021 for U.S. Appl. No. 29/692,746 (pp. 1-8).

\* cited by examiner

FIG. 4
FIG. 5
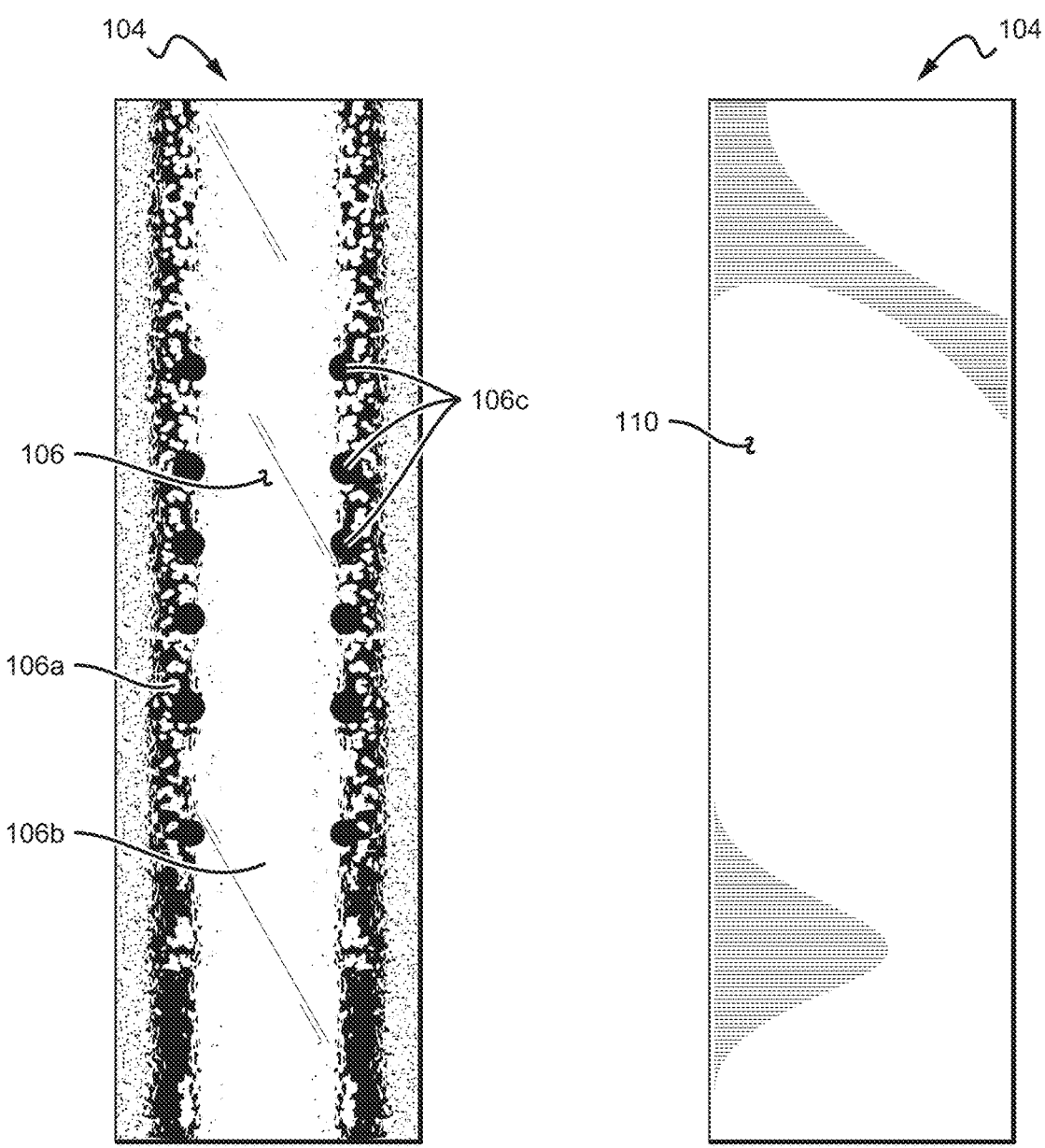
FIG. 6
FIG. 7

CUSTOMIZABLE FISHING LURES AND KIT FOR MAKING THE SAME

RELATED APPLICATIONS

This application claims the benefit of U.S. Provisional Pat. App. No. 62/853,650, filed on May 28, 2019. This application also is a continuation-in-part of U.S. Design Pat. application. No. 29/692,744, filed on May 28, 2019. This application also is a continuation-in-part of U.S. Design Pat. application. No. 29/692,746, filed on May 28, 2019. This application also is a continuation-in-part of U.S. Design Pat. application. No. 29/692,748, filed on May 28, 2019. Each of the applications referenced in this paragraph is incorporated by reference as if set forth fully herein.

BACKGROUND OF THE INVENTION

Field of the Invention

The present disclosure relates to a customizable and reusable fishing lure system and, more specifically, a lure system that includes replaceable and disposable skins and additional decorative and/or functional elements that cover a standard lure allowing it to be conveniently customized and repeatedly reused.

Description of the Related Art

Anglers are very selective about the lures that they purchase and use. Many fishing lures are painted in brightly colored patterns or designs to mimic a particular species of fish in order to attract the target fish, e.g., bass, tuna, marlin). Anglers may choose a lure for a particular fishing spot depending on the target fish, the environment, or knowledge about what lures the fish seem to be striking at the time.

Fishing tackle can be quite expensive, and if the angler wishes to carry several lures, the necessary equipment can take up a large amount of space in a tackle box, on a boat, or on land in storage. Lures also wear quickly. Having been bounced around a tackle box and fishing boat, on rocks, sand, trees, and other underwater debris, the lures can become damaged and the designs thereon (e.g., decals or paint jobs) unrecognizable and therefore less effective.

Anglers also use another kind of lure called a jig. These may also include designs that are attractive to the target fish, usually either decals or paint jobs. As with standard lures, once these jigs become damaged, their effectiveness greatly diminishes, and many anglers are forced to simply discard and replace the damaged jigs.

Thus, there is a need for customizable and reusable lure system that provides the angler with lure design options that may be easily applied and removed to a standard lure/jig. Such a system would allow the angler to dynamically tune his lure in the field to the target fish and conditions of the environment, while allowing repeated reuse of the base lure/jig.

The present disclosure also provides a method for making lure covers (sometimes referred to herein as skins or sheaths) and other applicable elements, and applying these covers or other elements to a base lure.

SUMMARY OF THE INVENTION

The present disclosure includes devices and designs for use in customizable and reusable fishing lure system. In some embodiments, devices include a base lure body and at least one lure cover which is applied to the lure body, for example, by using a shrink-wrap technique. The lure covers may include modifications, e.g., cuts or slits to provide a desired visual or movement effect. Other embodiments may include additional decorative or functional elements, such as a tail piece (e.g., a tail skirt), a scent pad, or the like. In some embodiments, the lure cover may also be coated with various substances to attract fish by scent or visual effect. The lure covers and elements may be designed to mimic certain types of bait. The lure cover and any of the additional elements may be used in combination to provide the desired customization.

These and other further features and advantages provided in this disclosure would be apparent to those skilled in the art from the following detailed description, taken together with the accompanying drawings.

BRIEF DESCRIPTION OF THE DRAWINGS

FIG. 4 is a magnified elevated view of the front end of a lure cover according to the present disclosure.

FIG. 5 is a right-side elevation view of the lure cover according to the present disclosure.

FIG. 6 is a top plan view of a lure cover according to the present disclosure.

FIG. 7 is a bottom plan view of a lure cover according to the present disclosure.

DETAILED DESCRIPTION OF THE INVENTION

Figure 1:
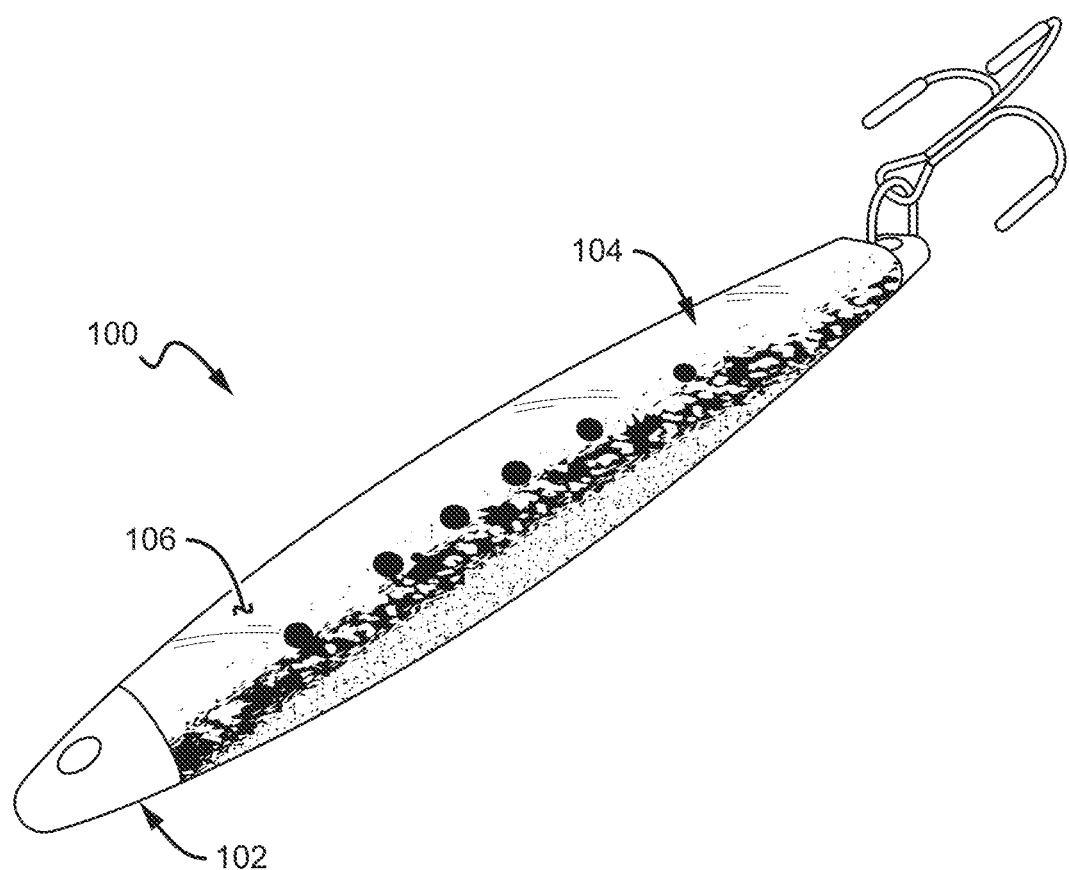
FIG. 1 shows an example of a custom lure according to the present disclosure.

Throughout this disclosure, the embodiments illustrated should be considered as exemplars, rather than as limitations on the present disclosure. As used herein, the term "invention," "device," "apparatus," "method," "disclosure," "present invention," "present device," "present apparatus," "present method," or "present disclosure" refers to any one of the embodiments of the disclosure described herein, and any equivalents. Furthermore, reference to various features of the "invention," "device," "apparatus," "method," "disclosure," "present invention," "present device," "present apparatus," "present method," or "present disclosure" throughout this document does not mean that all claimed embodiments or methods must include the reference features.

It is also understood that when an element or feature is referred to as being "on" or "adjacent" to another element or feature, it can be directly on or adjacent the other element or feature or intervening elements or features may also be present. In contrast, when an element is referred to as being "directly on" or extending "directly onto" another element, there are no intervening elements present. Additionally, it is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Furthermore, relative terms such as "inner," "outer," "upper," "top," "above," "lower," "bottom," "beneath," "below," and similar terms, may be used herein to describe a relationship of one element to another. Terms such as "higher," "lower," "wider," "narrower," and similar terms, may be used herein to describe angular relationships. It is understood that these terms are intended to encompass different orientations of the elements or system in addition to the orientation depicted in the figures.

Although the terms first, second, third, etc., may be used herein to describe various elements, components, regions, and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present disclosure. As used herein, the term "and/or" includes any and all combinations of one or more of the associated list items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. For example, when the present specification refers to "an" assembly, it is understood that this language encompasses a single assembly or a plurality or array of assemblies. It is further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Embodiments as described in the present disclosure can be described herein with reference to view illustrations, some of which are schematic in nature. As such, the actual thickness of elements can be different, and variations from the shapes of the some of the illustrations as a result, for example, of manufacturing techniques and/or tolerances are expected. Thus, the elements illustrated in the some of the figures are schematic in nature and their shapes are not intended to illustrate the precise shape of a region and are not intended to limit the scope of the disclosure. Furthermore, some embodiments described herein include identical or substantially similar elements. The same reference numerals are used throughout to identify these identical/similar elements.

FIG. 1 shows an example of a custom lure 100 according to the present disclosure. This embodiment includes a cover 104 that has been applied a body 102. This particular cover 104 is designed to mimic a common bait fish, here, a sardine. Portions of the lure cover 104 comprise a reflective surface 106 that will effectively reflect light as the lure 100 moves through the water, attracting fish to strike.

Figure 2:
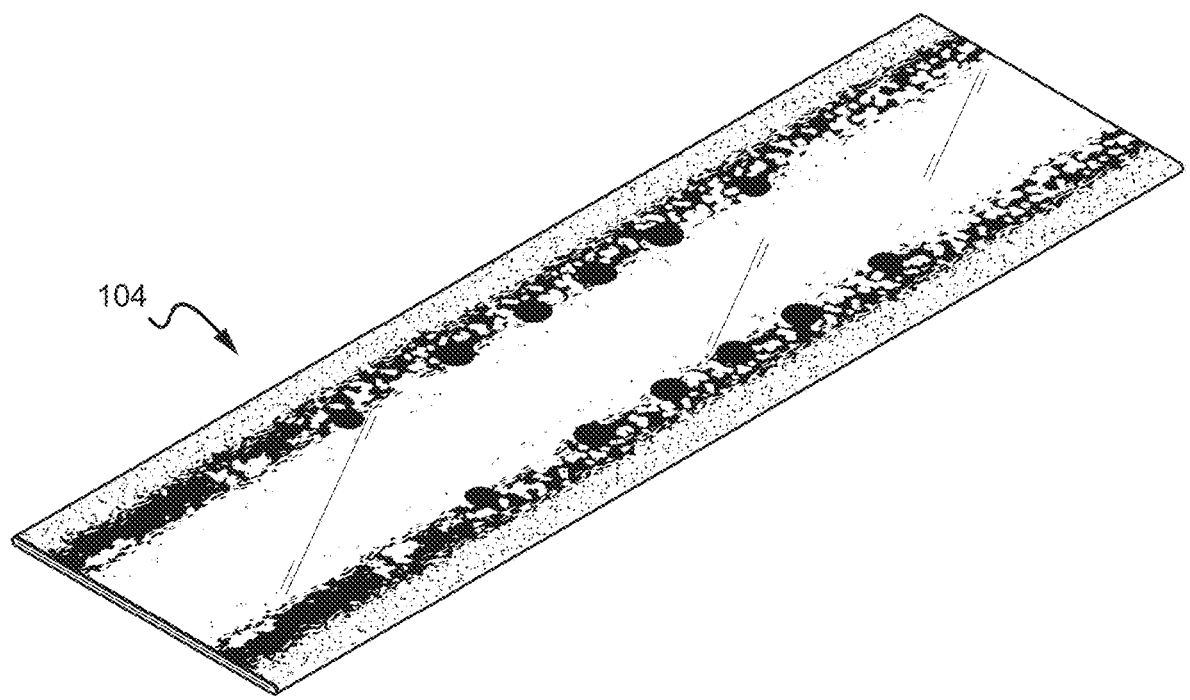
FIG. 2 is a perspective view of a lure cover according to the present disclosure.
Figure 3:
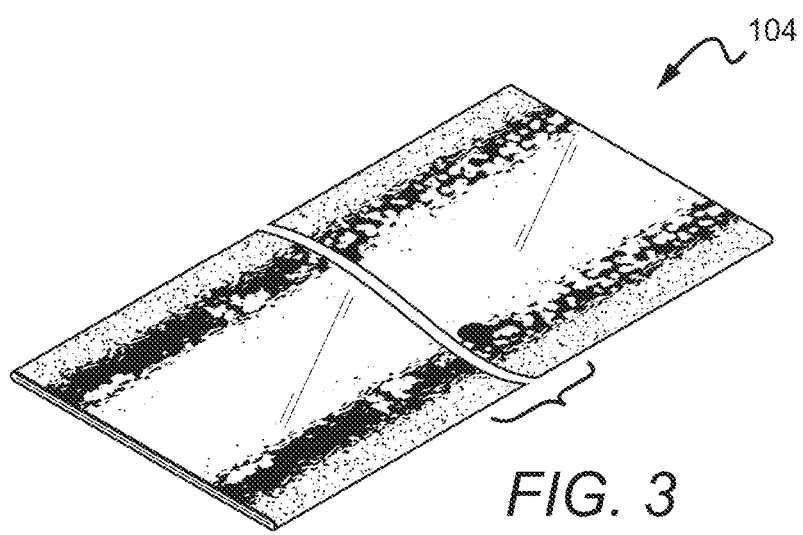
FIG. 3 is a perspective view of a lure cover of indeterminate length according to the present disclosure.

FIGS. 2-7 show various views of an embodiment of a lure cover 104 according to the present disclosure. FIG. 2 is a perspective view of a lure cover 104 with a design similar to that shown in FIG. 1. In FIG. 2, the lure cover 104 has not yet been applied to a lure body. Thus, the cover is shown as a substantially flat rectangular piece of material. FIG. 3 is a perspective view of a similar lure cover 104 of indeterminate length. Indeed, the lure covers can be sized to accommodate any desired lure body. FIG. 4 is a magnified elevated view of the front end of the lure cover. As shown, the lure cover 104 is hollow through its center creating a longitudinal opening 108 to allow for the cover 104 to be applied over a lure body during application. The lure cover 104 may be squeezed on the sides to enlarge the opening 108 and slide the cover over a body. FIG. 5 is a right-side elevation view of the lure cover 104. FIG. 6 is a top plan view of the lure cover 104. The top side of the cover 104 of this particular embodiment includes the design intended to mimic a sardine. The top side reflective surface 106 includes both diffuse reflective regions 106a and specular reflective regions 106b. Here, the specular reflective 106b is along the middle longitudinal portion of the cover 104. The cover 104 also includes solid spots 106*c* that further mimic the natural markings of bait fish. FIG. 7 shows a bottom plan view of the cover. The bottom side surface 110 of this particular embodiment is diffuse reflective. In other embodiments, the top and bottom sides may contain the same or different designs or patterns.

Figure 8:
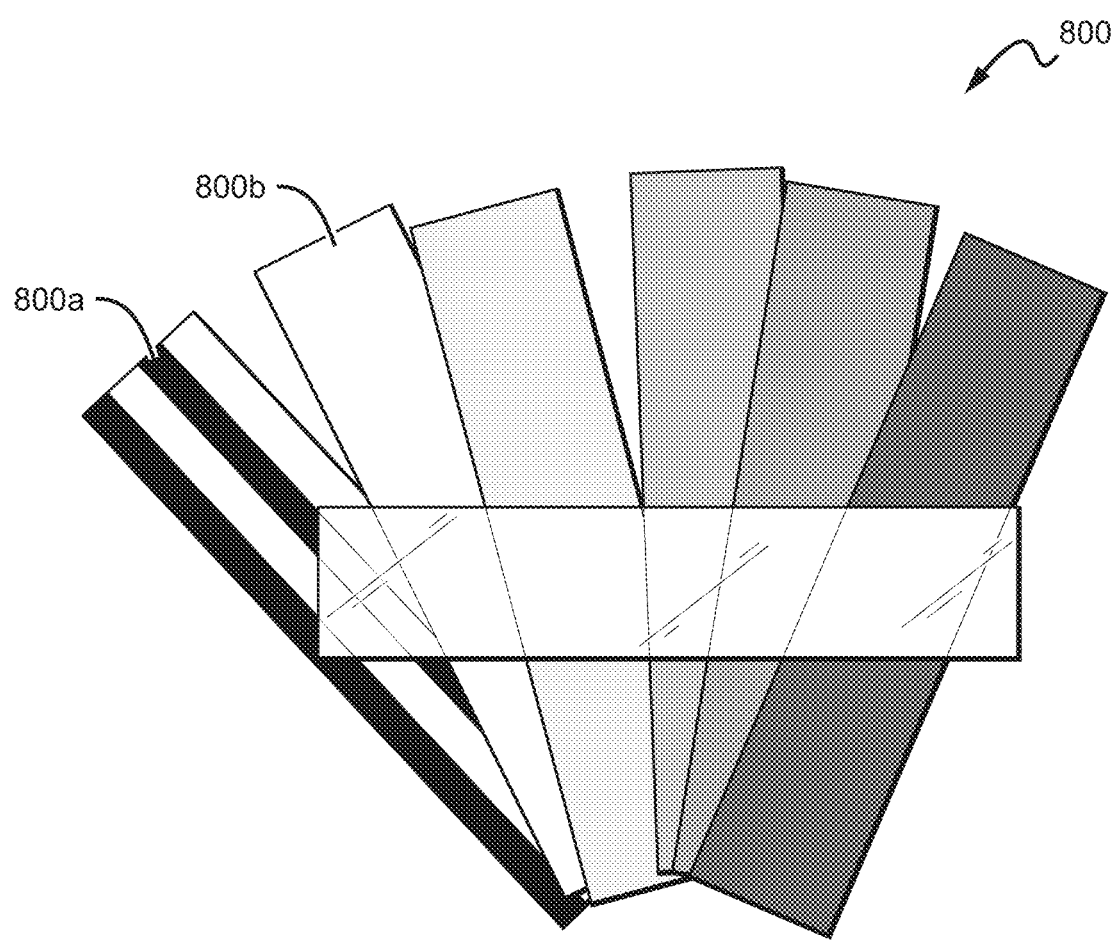
FIG. 8 shoes an assortment of exemplary lure covers according to the present disclosure.

FIG. 8 shows an assortment of exemplary lure covers 800 according to the present disclosure. The lure covers 800 may have any base color (e.g., cover 800*b*) and may be striped (e.g., cover 800*a*) or otherwise patterned as desired. In many embodiments, the lure covers have the shape of a flattened-out tube. Some embodiments do not have any longitudinal seams. Thus, these kinds of covers may be cut from an extrusion.

Figure 9:
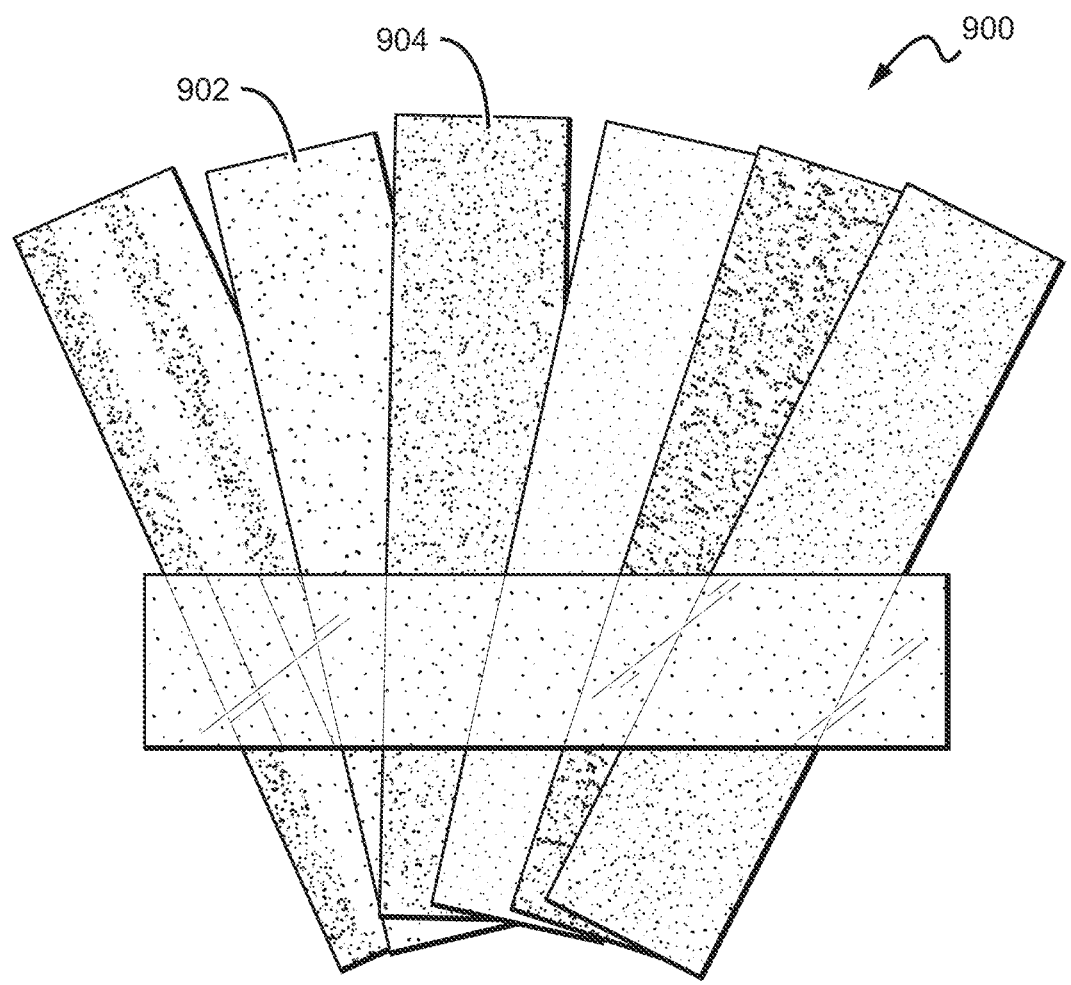
FIG. 9 shows another assortment of exemplary lure covers according to the present disclosure.

FIG. 9 shows another assortment of exemplary lure covers 900 according to the present disclosure. Each of these lure covers 900 include a pattern of speckles 902 which has applied to the body material. These patterns may include reflective speckles 904 or other reflective elements to enhance visibility.

Figure 10:
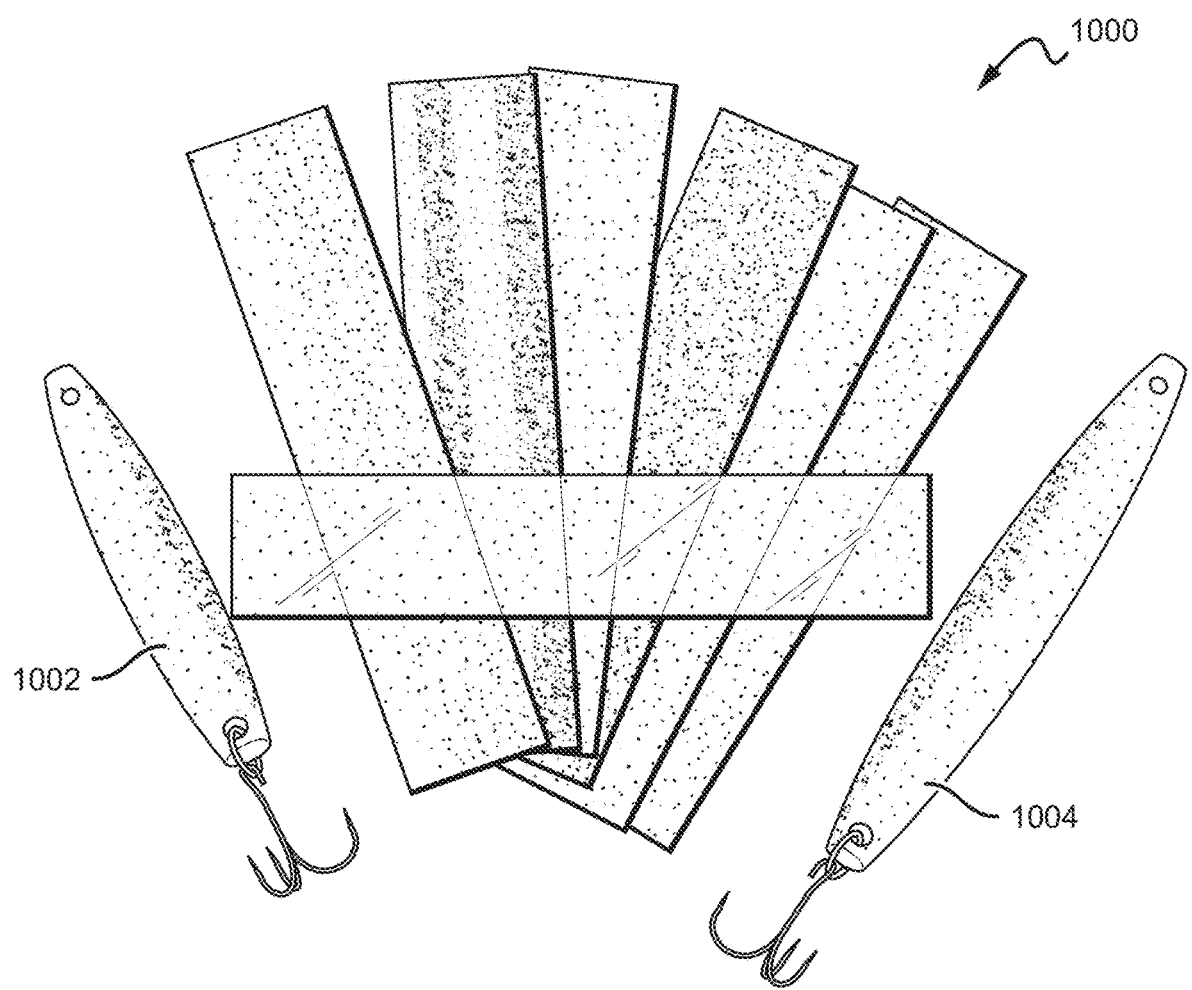
FIG. 10 shows another assortment of unapplied lure covers according to the present disclosure.

FIG. 10 shows another assortment of unapplied lure covers 1000 as well as two customized lures 1002, 1004 on which lure covers have been applied.

Figure 11:
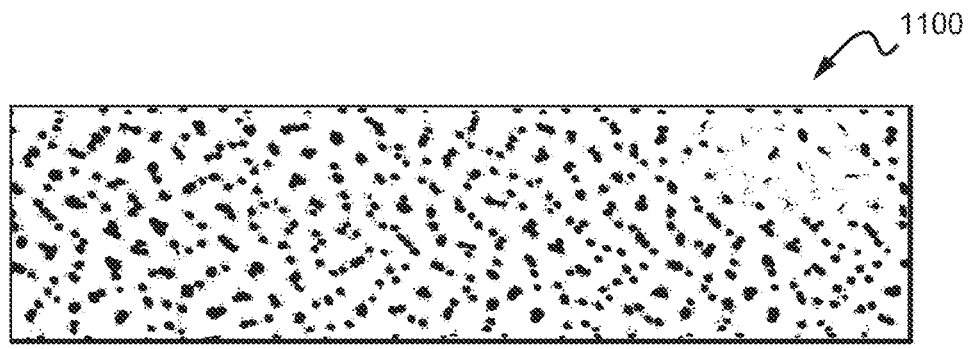
FIG. 11 is a top plan view of an unapplied lure cover according to the present disclosure.
Figure 12:
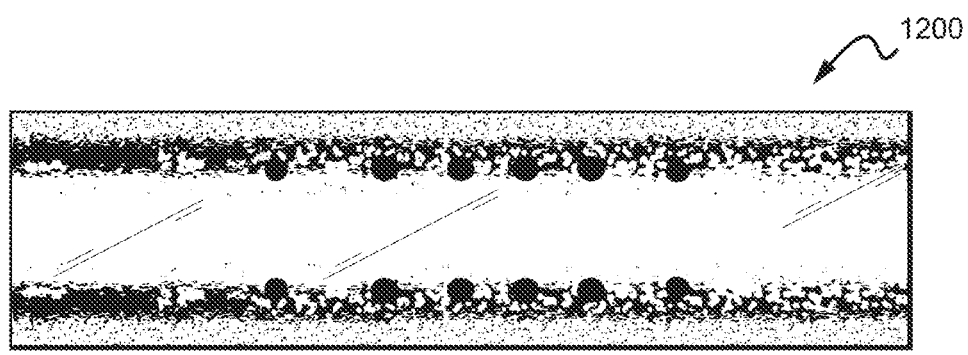
FIG. 12 is a top plan view of an unapplied lure cover according to the present disclosure.
Figure 13:
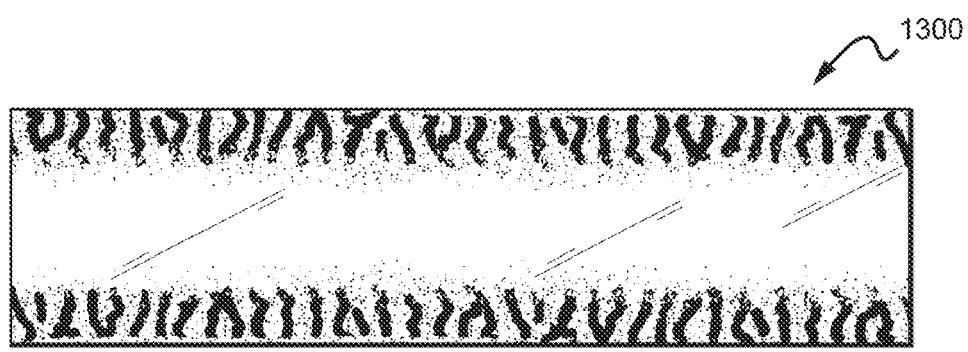
FIG. 13 is a top plan view of an unapplied lure cover according to the present disclosure.
Figure 14:
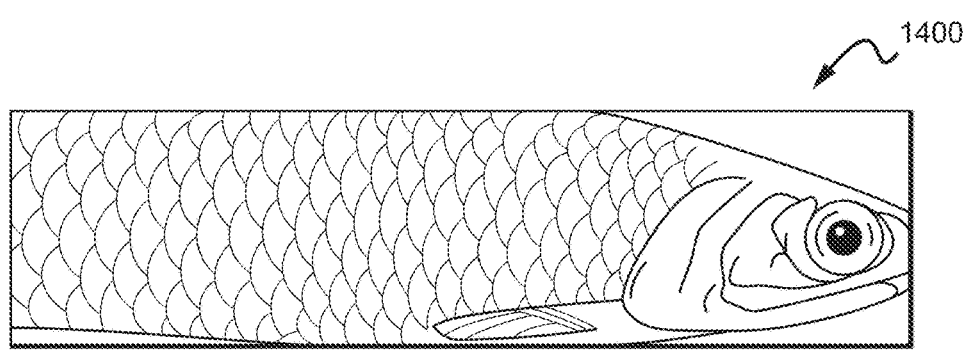
FIG. 14 is a top plan view of an unapplied lure cover according to the present disclosure.

FIGS. 11-14 show various embodiments of lure covers, 1110, 1200, 1300, 1400 according to the present disclosure. FIG. 11 shows a lure cover 1200 with a spotted pattern including two different colors of spots on a brightly colored background. FIG. 12 shows a lure cover 1200 with the previously disclosed sardine design. The design includes longitudinal strips of different colors and reflectivities and a plurality of dark spots. FIG. 13 shows a lure 1300 that includes a different design that is intended to mimic a mackerel, another common bait fish. FIG. 14 shows a lure cover 1400 with an image of a fish printed onto a striped background. It is understood that any combination of stripes, spots, speckles, patterns, images, and other visual elements can be used to produce a desired effect. It is also understood that many different color combinations are possible. It is also understood that reflective elements may be used in many different combinations.

The lure covers can be made from many different materials. Lure cover materials should be susceptible to contraction in the presence of intense heat, with most of the contraction occurring in a radial direction rather than in a longitudinal direction. Some suitable materials include various types of heat-shrink tubing (referred to herein as "heatshrink"). Heatshrink is a shrinkable plastic tube often used to insulate electrical wires. Heatshrink is ordinarily made of polyolefin, which shrinks radially (but not longitudinally) when heated, to between one-half and one-sixth of its original diameter. Heatshrink tubing is manufactured in a multitude of varieties and chemical compositions. It may be manufactured from a thermoplastic material such as polyolefin, fluoropolymer (such as FEP, PTFE or Kynar), PVC, neoprene, silicone elastomer or Viton, for example. Other materials may be suitable as well. A suitable material will also be water-resistant, hydro-durable, and safe for use with respect to underwater ecosystems.

In one embodiment, the covers are formed from heatshrink tubing that does not contain a seam. In this embodiment, the covers may be cut from a single continuous piece of material. In other embodiments, the covers could be manufactured separately. Furthermore, in other embodiments, the covers may be a single tubular piece of material with no seams. In such an embodiment, when the fisherman wants to remove a lure cover from the body, the cover can simply be cut to be removed.

Figure 15A:
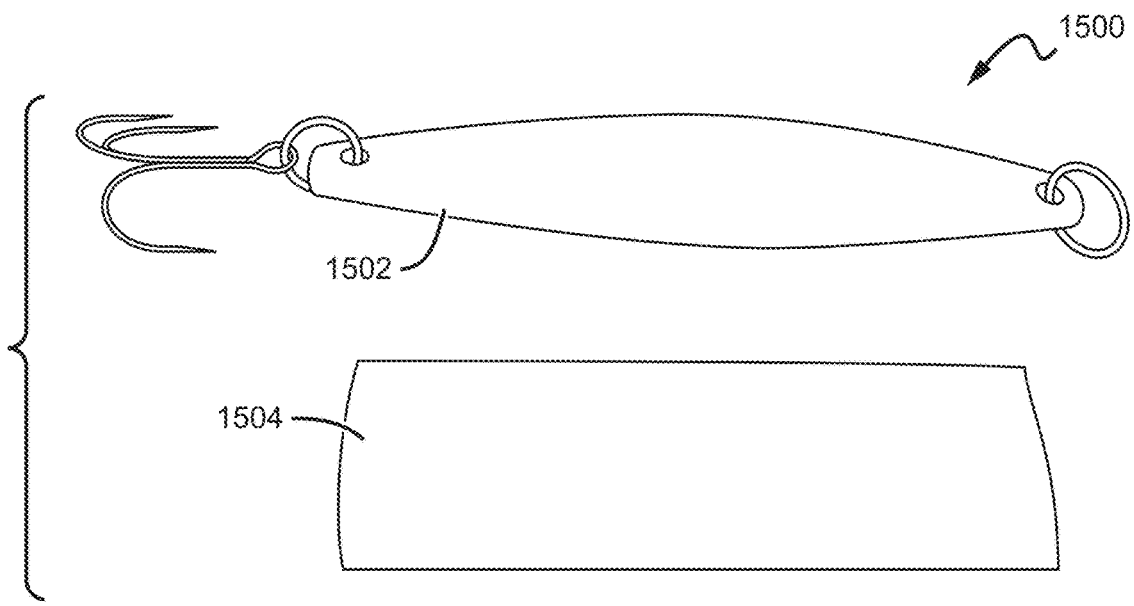
FIGS. 15a-c show a custom lure in various stages of production according to the present disclosure.
Figure 15B:
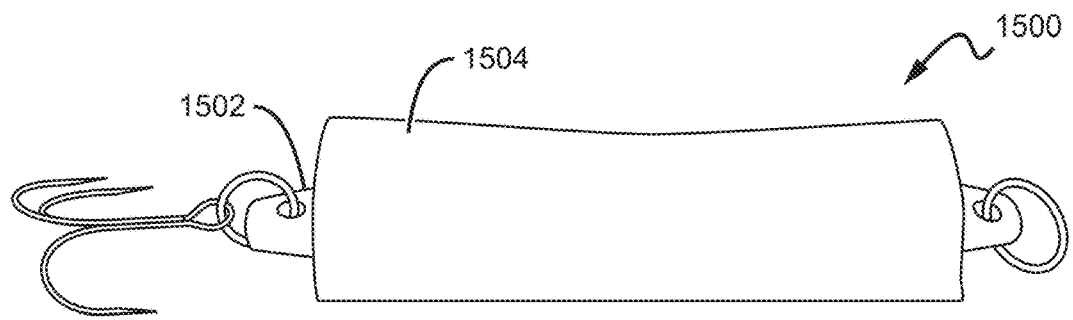
Figure 15C:
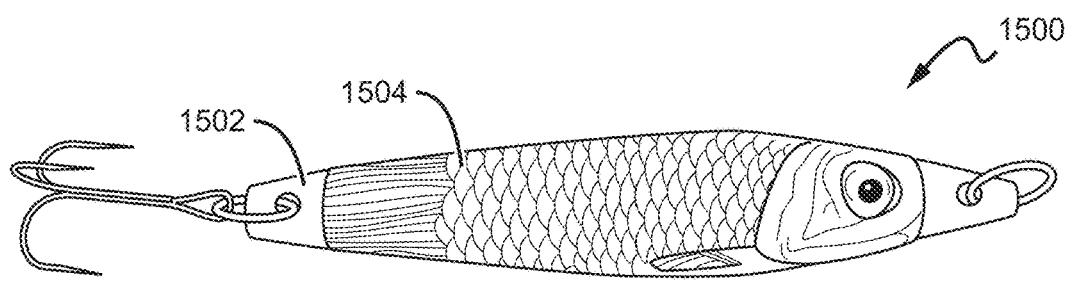

FIGS. 15*a-c* show a custom lure 1500 in various stages of production. In FIG. 15*a* a lure body 1502 is shown with an unapplied lure cover 1504. In FIG. 15*b*, the lure cover 1504 has been spread open and slid over the lure body 1502. FIG. 15*c* shows the lure cover 1504 after it has been shrunk over the lure body 1502 to create a tight conformal fit. In one method of making the custom lure 1500, the lure body 1502 and cover 1504 combination shown in FIG. 15*b* is brought into proximity with a heat source, such as a heat gun, for example. The heat causes the lure cover 1504 to shrink over the body 1502 as shown in FIG. 15*c*. The lure body 1502 and cover 1504 combination can also be heated in an oven. Various ovens may be used to produce several custom lures at the same time, or a smaller portable electric oven may be used to produce single custom lures or a few at time, for example, on a boat or a dock. Any heat source with sufficient power may be used to shrink the lure covers over the body. The lure cover designs may be applied prior to application of the lure cover onto a body (e.g., like those in FIGS. 11-14) or after the cover has already been applied, such as has been done on the lure in FIG. 15*c* where the design was hand-drawn onto the lure cover 1504, post-application.

Figure 16A:
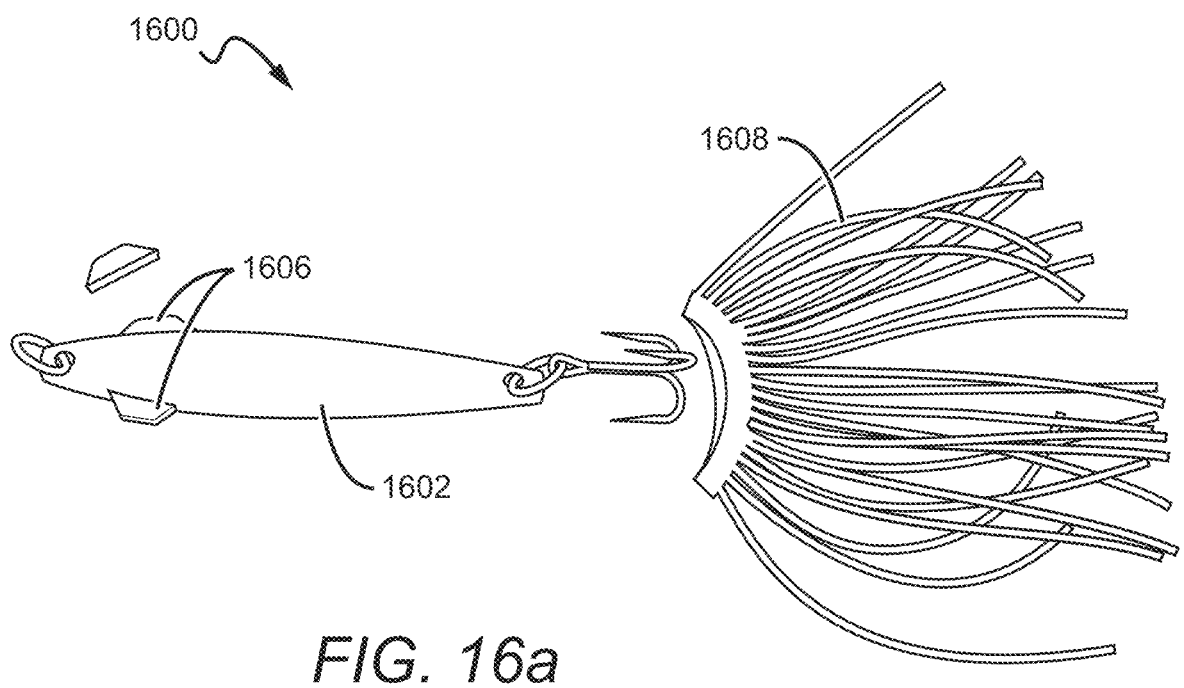
FIGS. 16a-d show a custom lure in various stages of production according to the present disclosure.
Figure 16B:
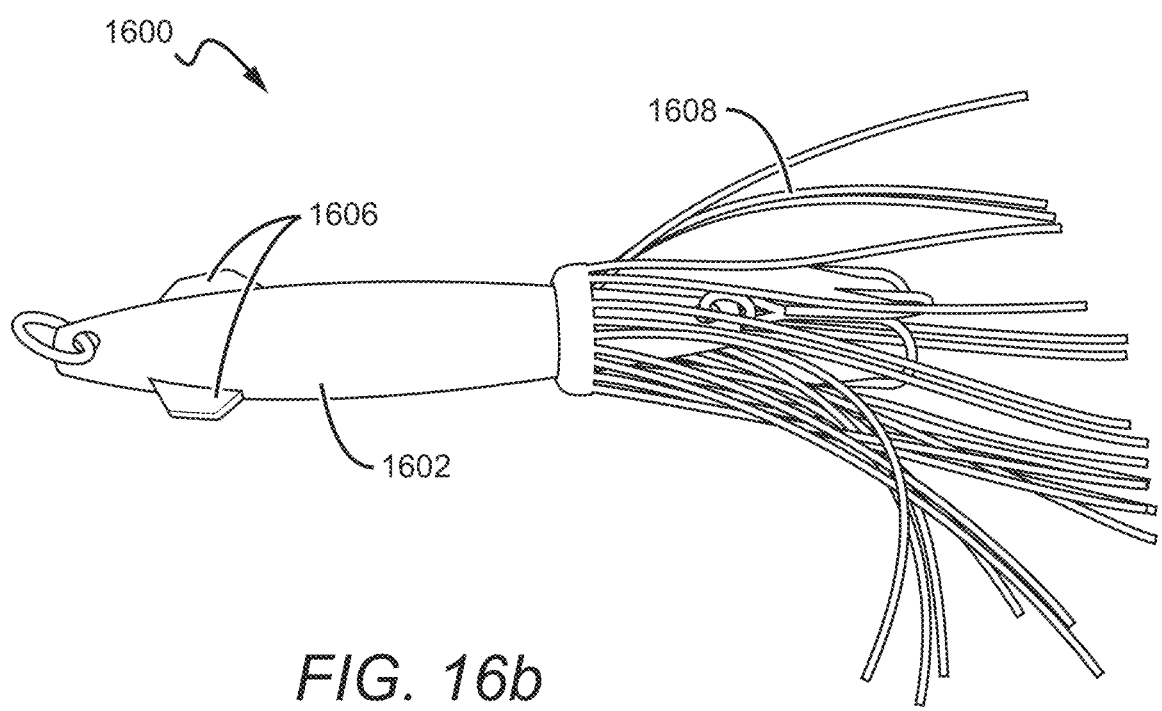
Figure 16C:
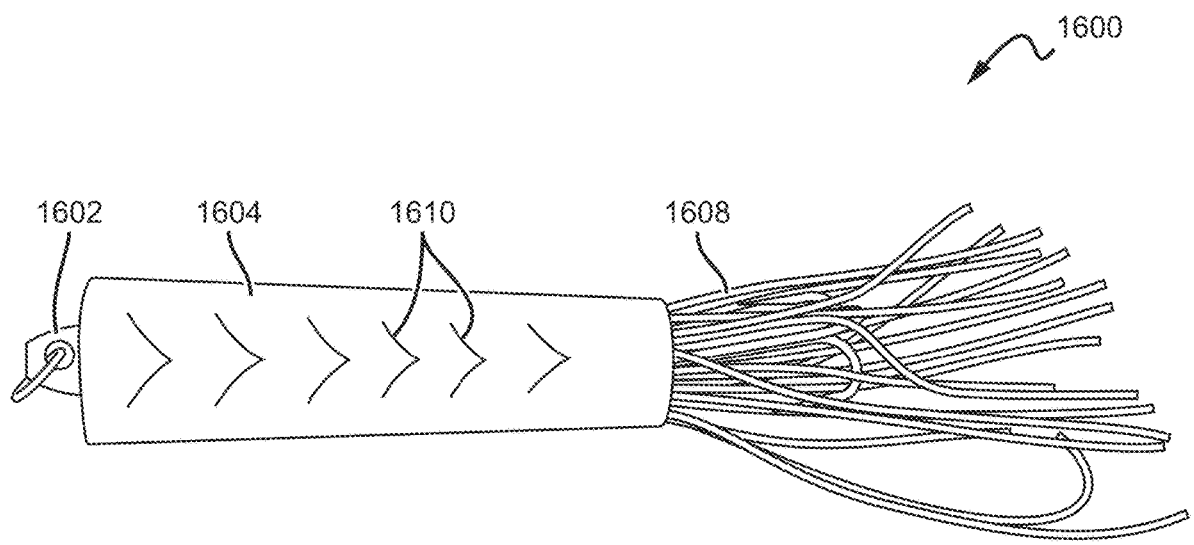
Figure 16D:
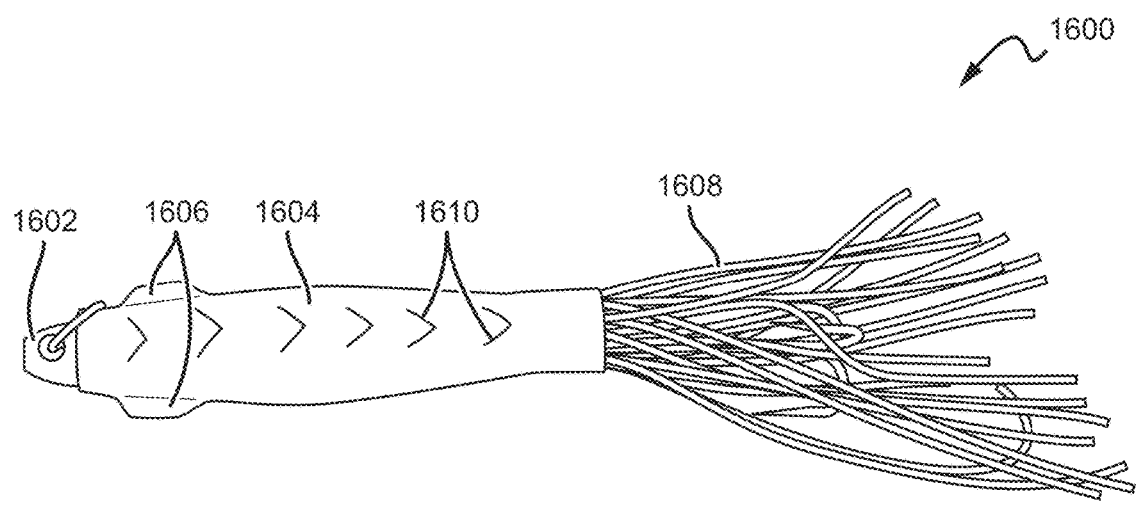

FIGS. 16*a-d* show a custom lure 1600 in various stages of production. Along with a lure cover, many other kinds of additional attachments can be applied to achieve a particular visual or movement effect. In one embodiment of the custom lure 1600 according to the present disclosure, contour structures 1606, such as the yellow pads shown in FIG. 16*a*, may be applied to various points or regions on the lure body 1602 to create a contour beneath the lure cover 1604. For example, the contour structures 1606 in FIGS. 16*a*, 16*b* are used to create that appearance of gill structures. The contour structures 1606 may be applied using a light adhesive prior to application of the lure cover 1604. After the shrink step, the contour structures 1606 will be held snugly in place against the lure body 1602. The custom lure 1600 in FIGS. 16*a-d* also comprises a tail skirt 1608 that may be used to provide the appearance of tentacles or similar structures. This particular embodiment is designed to mimic a squid or another cephalopod. Similarly as the contour structures 1606, the tail skirt 1608 may be wrapped around the lure body 1602 and held in place with a light adhesive or elastic band prior to application of the cover 1604 as shown in FIG. 16*b*. A portion of the tail skirt 1608 may be interposed between the body 1602 and the cover 1604 such that the tail skirt 1608 is held in place against the body 1602 by the cover 1604. In FIG. 16*c*, the cover 1604 is positioned on the lure body 1602 and over top of the contour structures 1606 and tail skirt 1608. FIG. 16*d* shows the custom lure 1600 after exposing the lure 1600 to heat such that the cover 1604 is shrunk to the body 1602, holding the contour structures 1606 and tail skirt 1608 firmly in place. It is also apparent in FIGS. 16*c*, 16*d* that a number of v-shaped slits 1610 have been cut into the lure cover 1604 prior to application. This will be discussed in more detail herein.

Figure 17A:
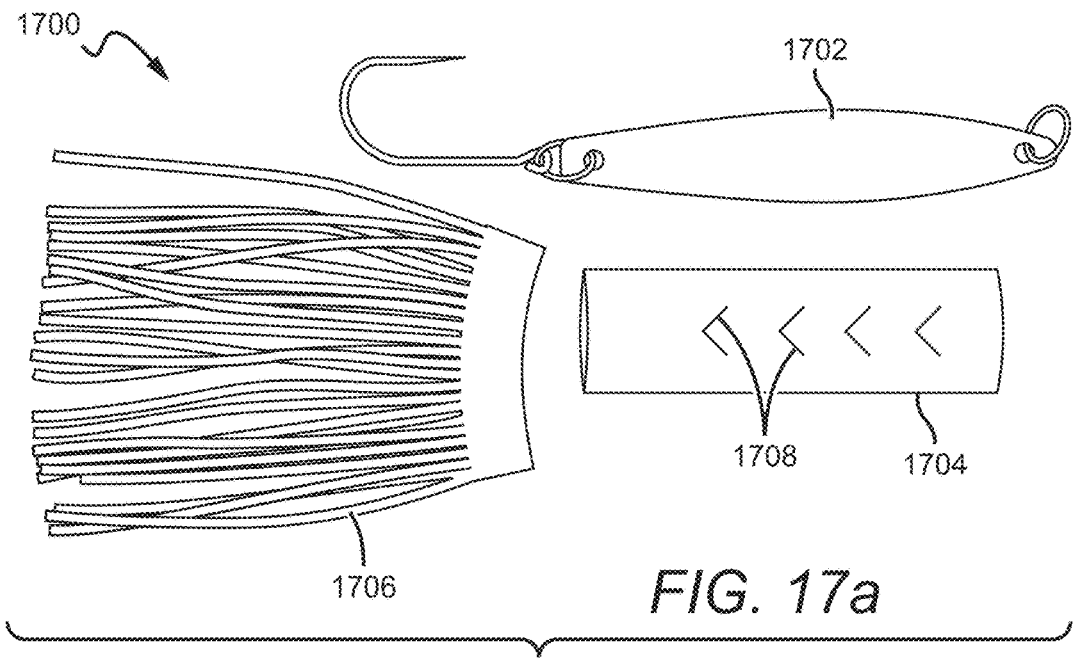
FIGS. 17a-c show another embodiment of a custom lure according to the present disclosure.
Figure 17B:
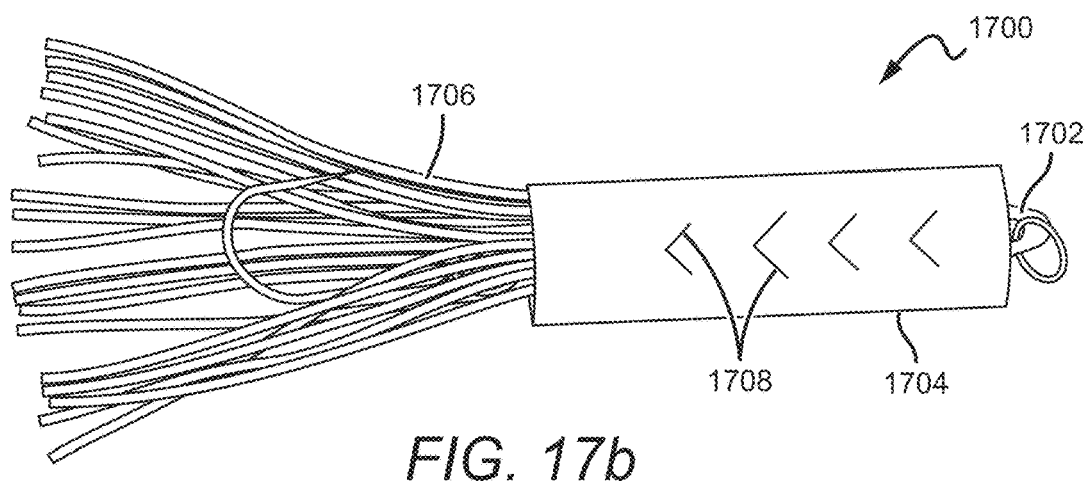
Figure 17C:
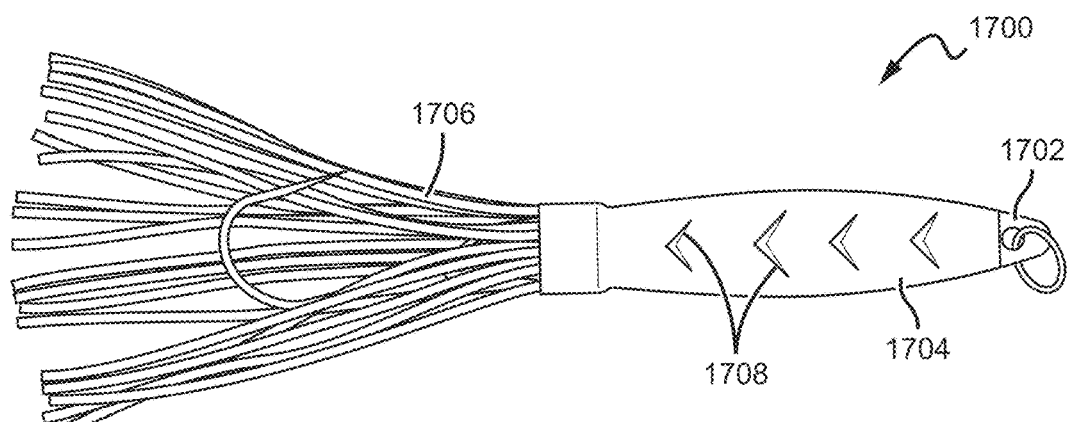

FIGS. 17*a-c* show another embodiment of a custom lure 1700 according to the present disclosure. In this particular embodiment, the lure 1700 comprises a body 1702, a tail skirt 1706 and a cover 1704 with several slits 1708 cut into it.

Figure 18A:
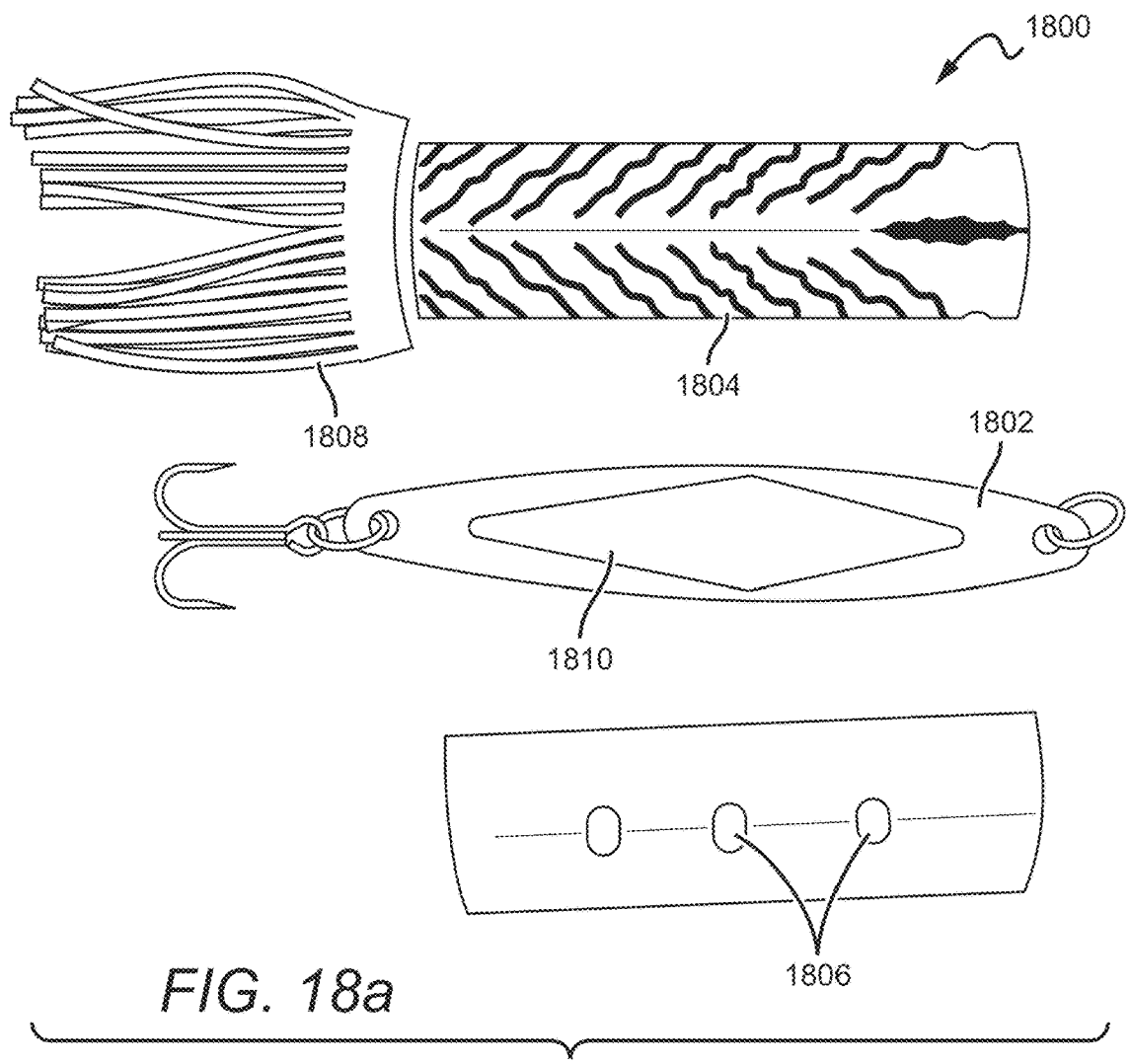
FIGS. 18a, 18b show another embodiment of a custom lure according to the present disclosure.
Figure 18B:
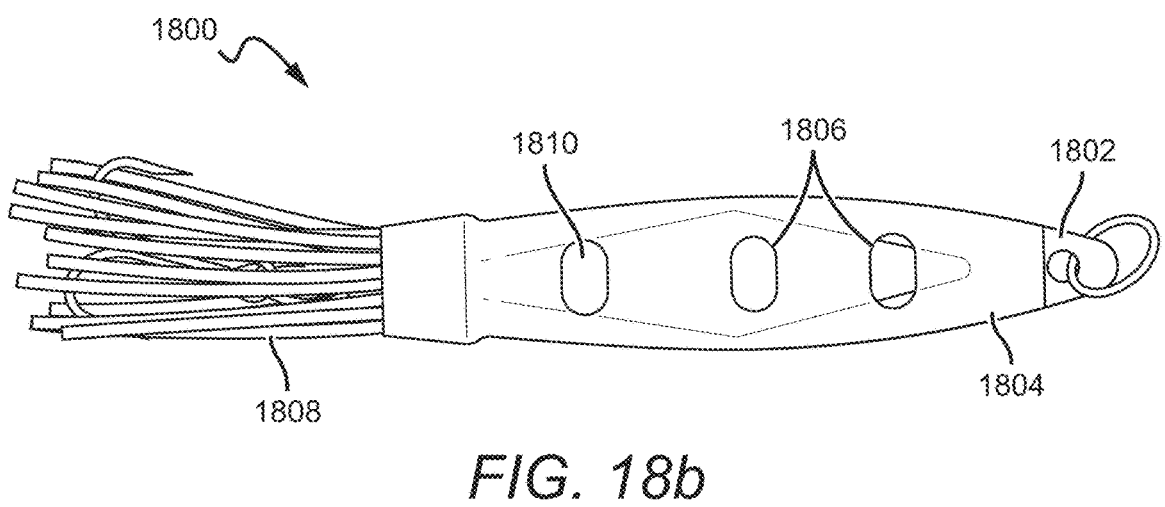

FIGS. 18*a*, 18*b* show another embodiment of a custom lure 1800 according to the present disclosure. This particular embodiment comprises a body 1802, a printed cover 1804 with holes 1806 cut into it, a tail skirt 1808, and a scent pad 1810 (sometimes referred to by anglers as a "stinkpad"). The tail skirt 1808 and stink pad 1810 are arranged on the body 1802, and then the cover 1804 is applied over top and shrunk to the body 1802. Here, a series of holes 1806 have been cut in the side of the cover 1804 prior to application. The holes 1806 are positioned to align with the scent pad 1810 underneath. This allows the scent pads 1810 to come into contact with the water so that particles are distributed into the water to be detected by game fish in the area. Various different kinds of scent pads 1810 can be used. Alternatively, various chemicals can be applied to a lure cover either before or after application to create a similar effect.

Figure 19A:
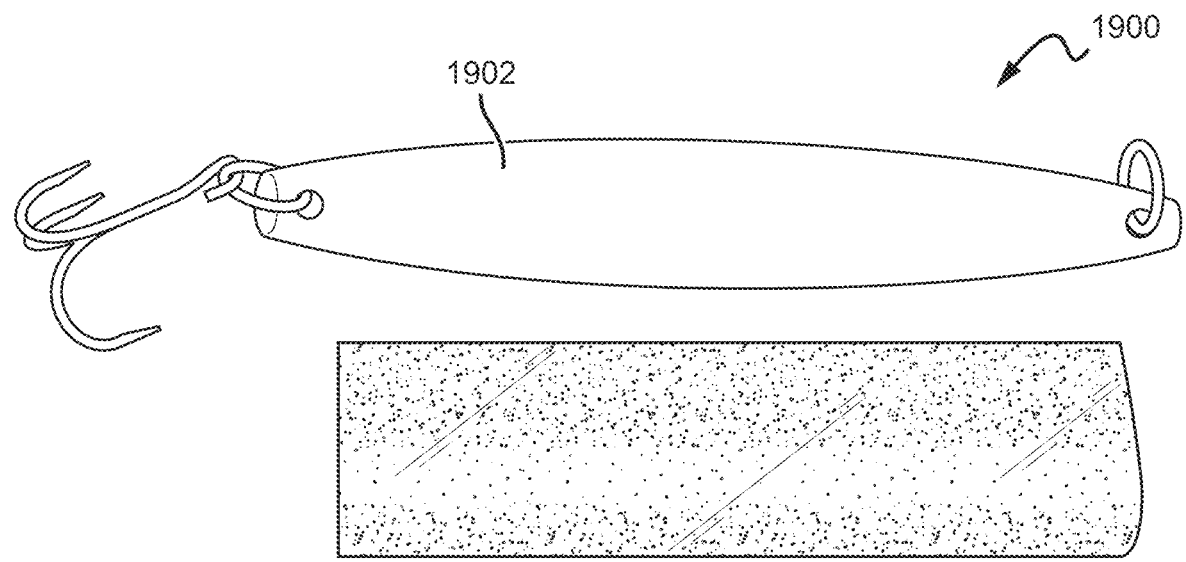
FIGS. 19a, 19b show another embodiment of a custom lure according to the present disclosure.
Figure 19B:
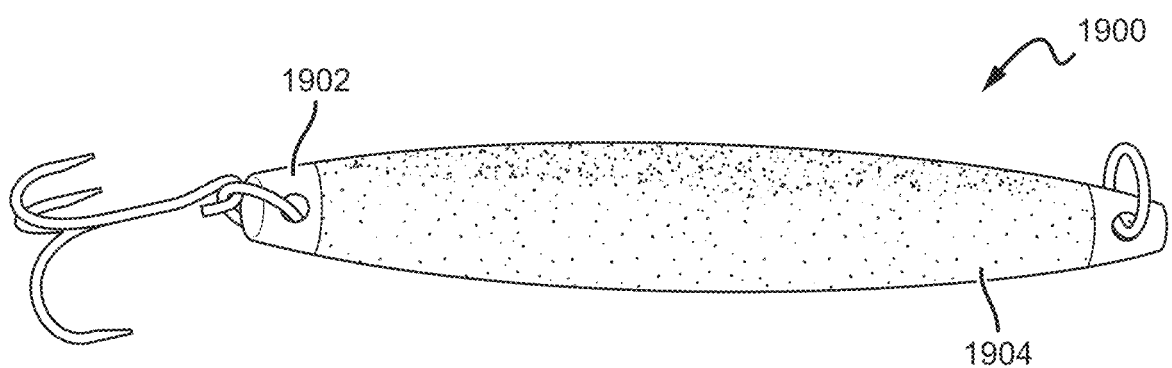

FIGS. 19*a*, 19*b* show another embodiment of a custom lure 1900 according to the present disclosure. In this embodiment, a translucent cover 1904 is applied to a brightly colored lure body 1902. This particular lure 1900 is designed with a glitter speckle pattern that contrasts subtly with the solid background. As shown, lure covers can comprise a variety of body materials such as, transparent, translucent, or opaque materials. These covers may come in any desired color.

Figure 20A:
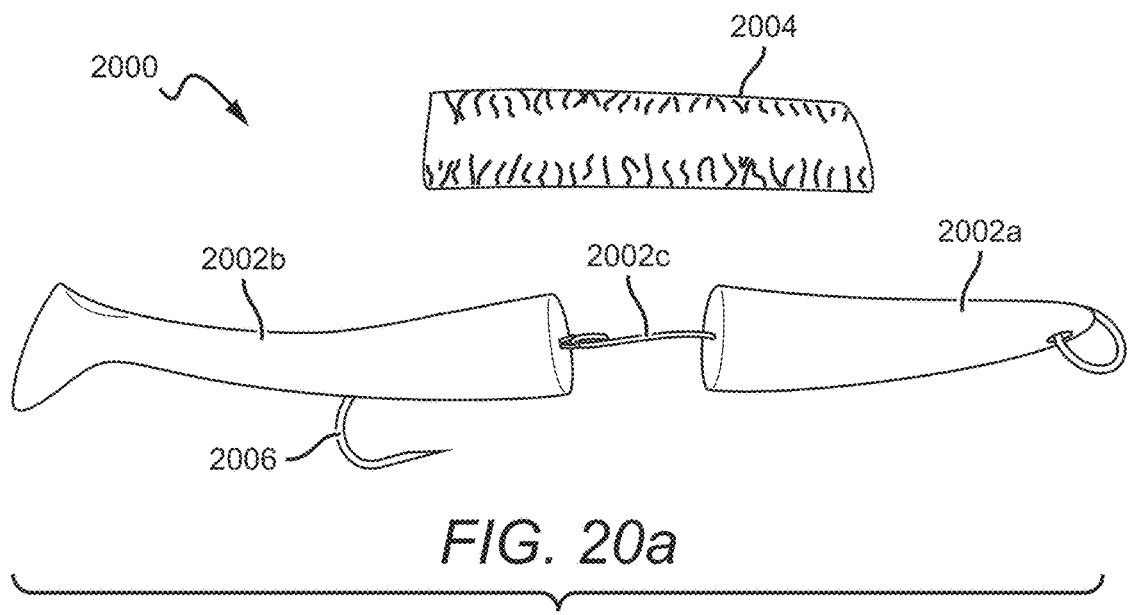
FIGS. 20a-c show another embodiment of a custom lure according to the present disclosure.
Figure 20B:
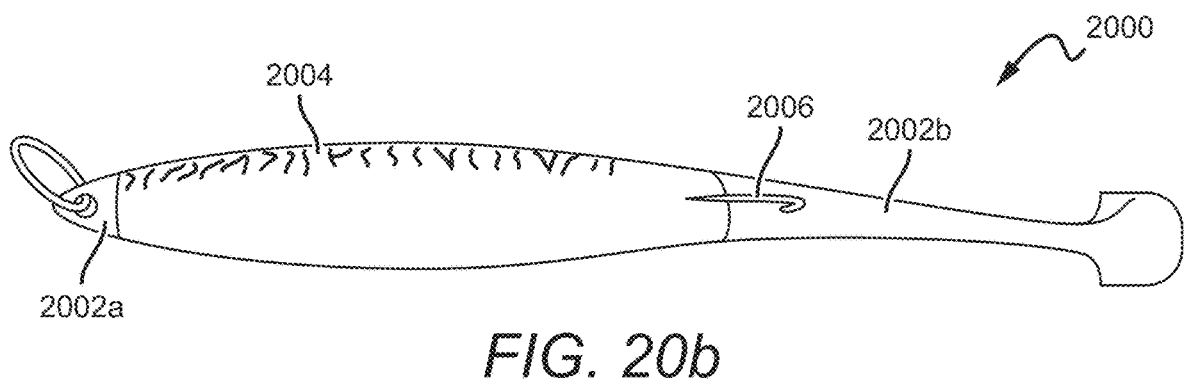
Figure 20C:
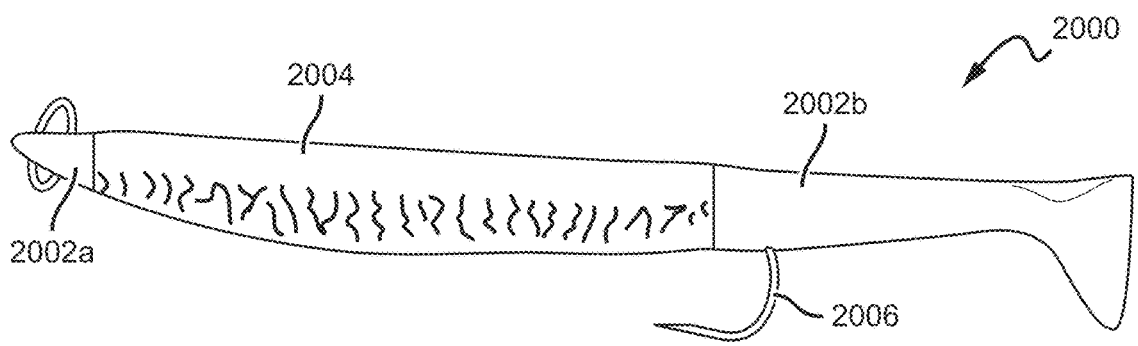

FIGS. 20*a-c* show another embodiment of a custom lure 2000 according to the present disclosure. This particular embodiment includes a two-piece body 2002, including a rigid component 2002*a* and a flexible tail component 2002*b*. Here, the rigid component 2002*a* is made from metal and the tail component 2002*b* is made from silicone. FIG. 20*a* shows both components 2002*a*, 2002*b* prior to attachment. In one embodiment, the flexible tail component 2002*b* is attached to the rigid component 2002*a* using an internal wire 2002*c*. At one end the wire 2002*c* is attached to a central region of the flexible tail component 2002*b*; the other end is fed into a longitudinal hole in the rigid component 2002*a* and seated therein. The wire 2002*c* may be held in place by a transverse set screw assembly, for example. The set screw (not shown) may be tightened and loosened via an access hole (not shown) in the side of the rigid component 2002*a*. Many other methods and structures may be used to attach the two components 2002*a*, 2002*b*. Once the flexible component 2002*b* and the rigid component 2002*a* are attached, a cover 2004 may be applied to the body 2002 effectively hiding the joint seam between the two components and providing additional structural support.

Figure 21:
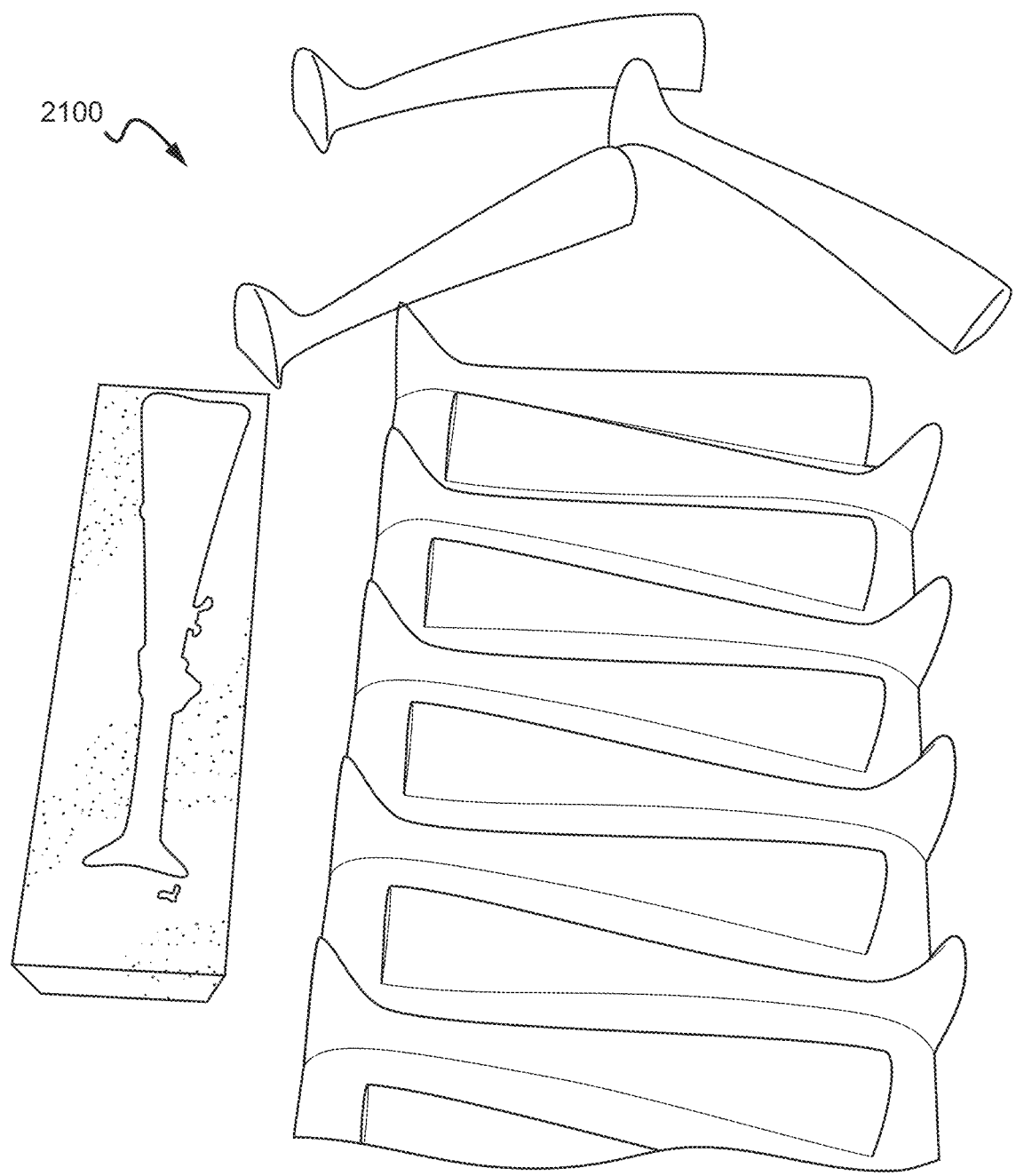
FIG. 21 is a perspective view of a silicone mold and several lure components made therewith according to the present disclosure.

The flexible tail component 2002*b* may be fabricated using a silicone mold 2100 such as the one shown in FIG. 21. A significant portion of the flexible component 2002*b* may be exposed after application of the cover 2004. This allows the flexible component 2002*b* to wiggle in the water as the lure 2000 is used, providing visible motion and currents that may attract fish. The flexible portion 2002*b* may also be colored or patterned to correspond with certain cover designs to provide a cohesive design. The flexible component 2002*b* also allows for various hook arrangements by inserting one or more hooks 2006 through various areas of the component. Thus, the flexible tail component 2002*b* provides additional degrees of customization.

Figure 22:
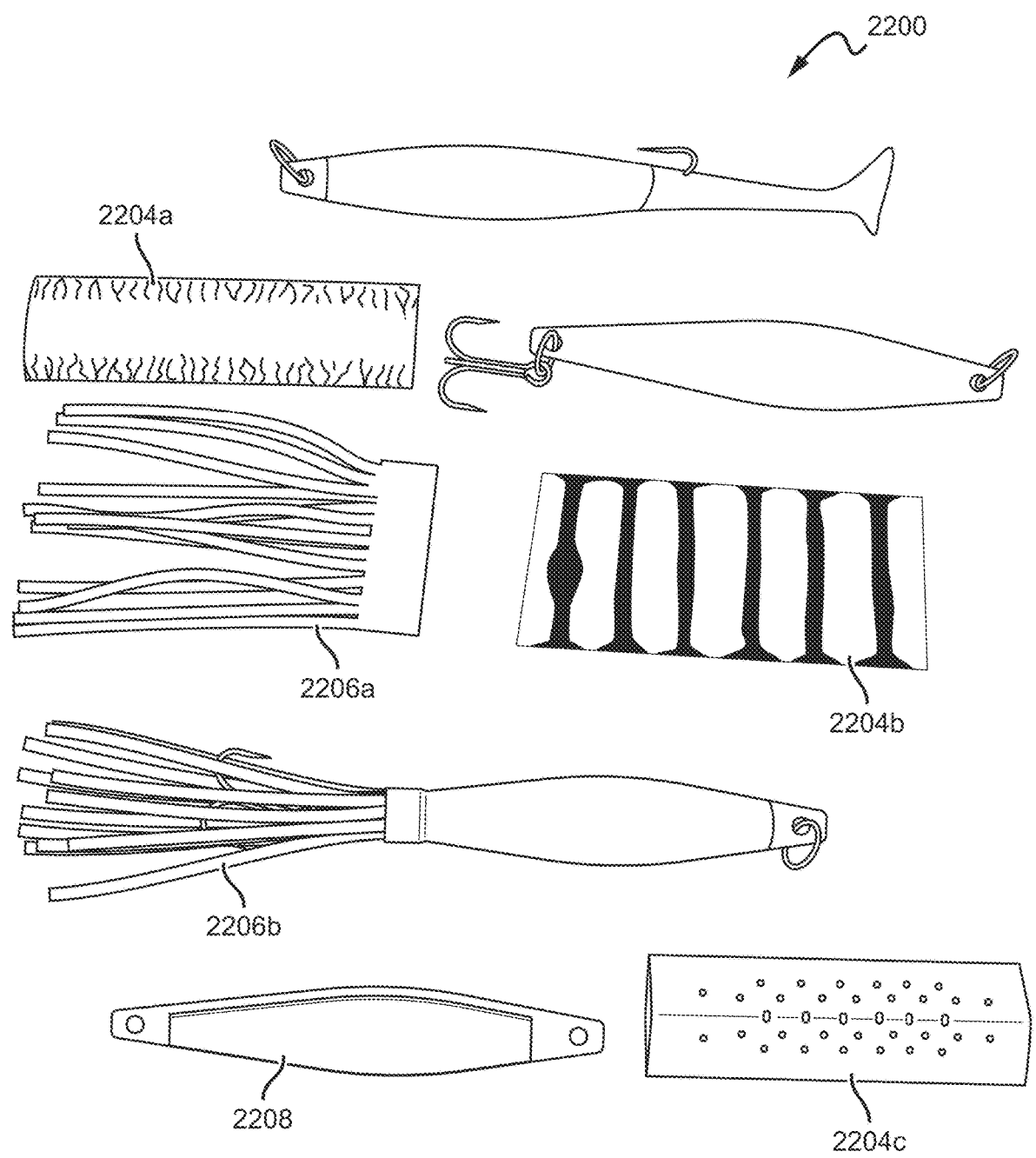
FIG. 22 is a top plan view of a few other embodiments of custom lures and additional lure components according to the present disclosure.

FIG. 22 shows a few other embodiments of custom lures and additional components that may be used to customize the lures, for example: covers 2204*a-c*, tail skirts 2206*a-b*, and scent pad 2208. Tail skirts 2206 may be formed out of a single sheet of rectangular silicone. A plurality of slits may be cut in a longitudinal direction to provide the desired fringe structure.

Figure 23A:
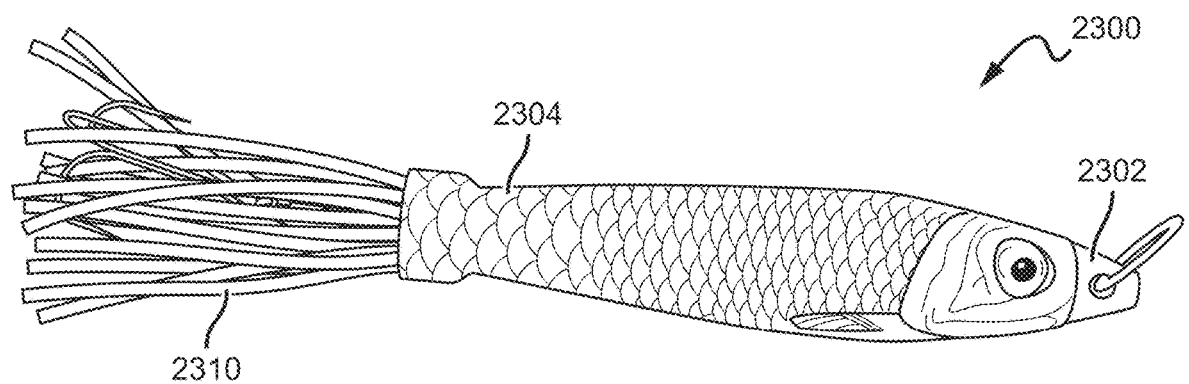
FIG. 23a is a right side elevation view of a custom lure according to the present disclosure.
Figure 23B:
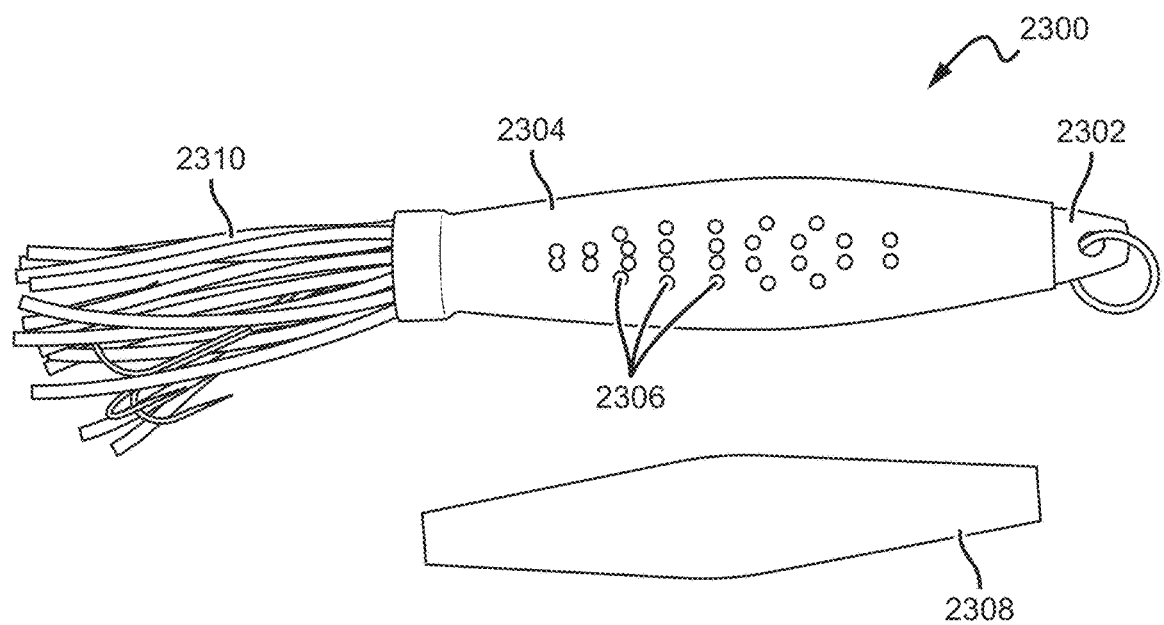
FIG. 23b is a bottom plan view of a custom lure according to the present disclosure.

FIGS. 23*a*, 23*b* show another embodiment of a custom lure 2300 according to the present disclosure. This particular embodiment comprises a body 2302, a printed cover 2304 with several holes 2306 cut in the bottom, a scent pad 2308, and a tail skirt 2310. The cover holes 2306 are designed to align with the scent pad 2308 to expose the pad 2308 to the water. A replacement scent pad 2308 is also shown.

Figure 24A:
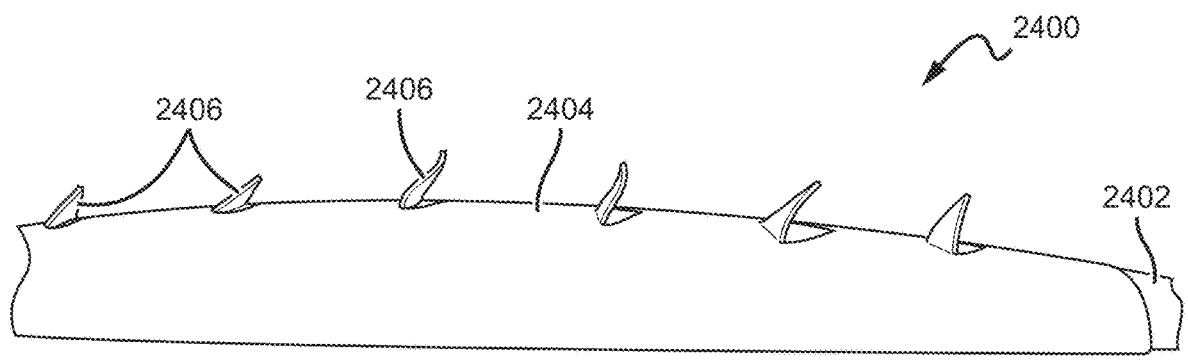
FIG. 24a is a right side elevation view of a custom lure according to the present disclosure.
Figure 24B:
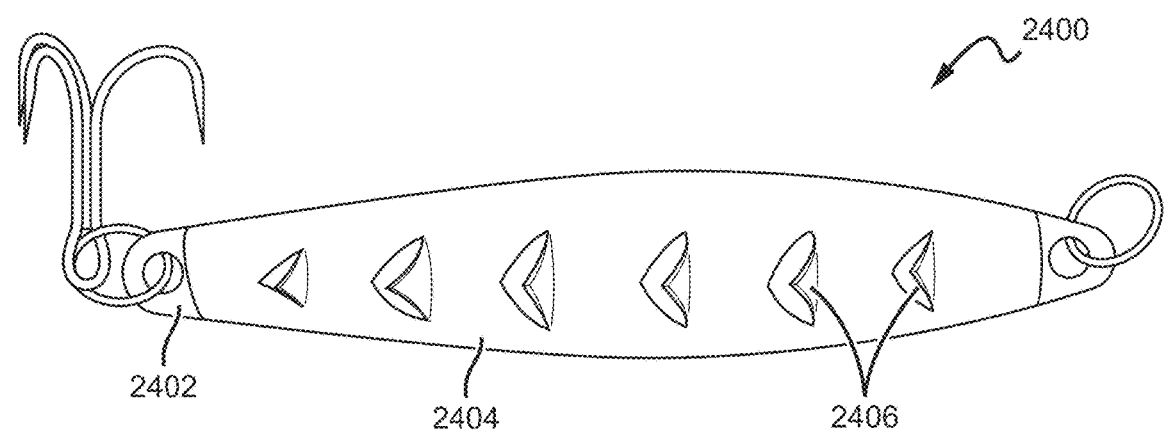
FIG. 24b is a top plan view of a custom lure according to the present disclosure.

FIGS. 24*a*, 24*b* show another embodiment of a custom lure 2400 according to the present disclosure. This particular embodiment comprises a body 2402 and a cover 2404. Here, the cover 2404 has several v-shaped slits 2406 cut into it. The slits 2406 can be cut either before or after application of the cover 2404 to the body 2402. Various slit shapes can be used to produce a desired visual or motion effect. For example, the v-shaped slits 2406 give the appearance of gill-like structures on the lure 2400. The slits 2406 may also cause the lure 2400 to wiggle as it moves through the water, creating movement and currents that may attract fish. It is understood that slits, cuts, or holes can be shaped in various ways and positioned on a cover in various places to achieve a desired effect.

Figure 25A:
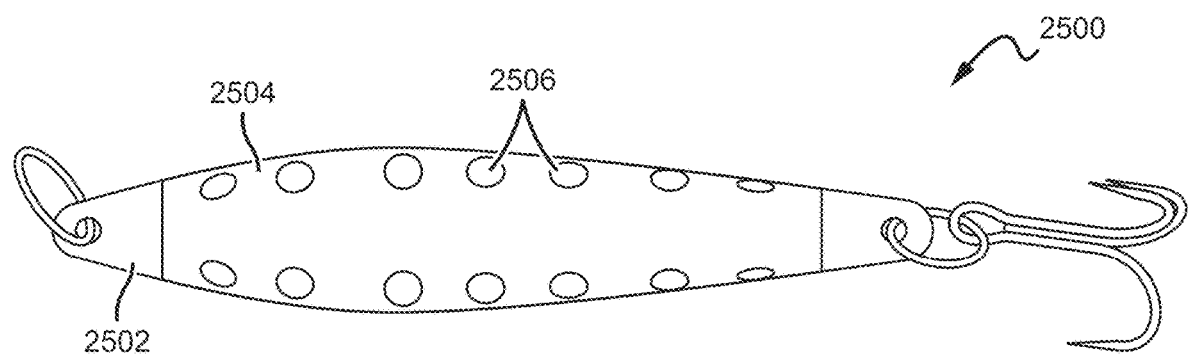
FIG. 25a is a top plan view of a custom lure according to the present disclosure.
Figure 25B:
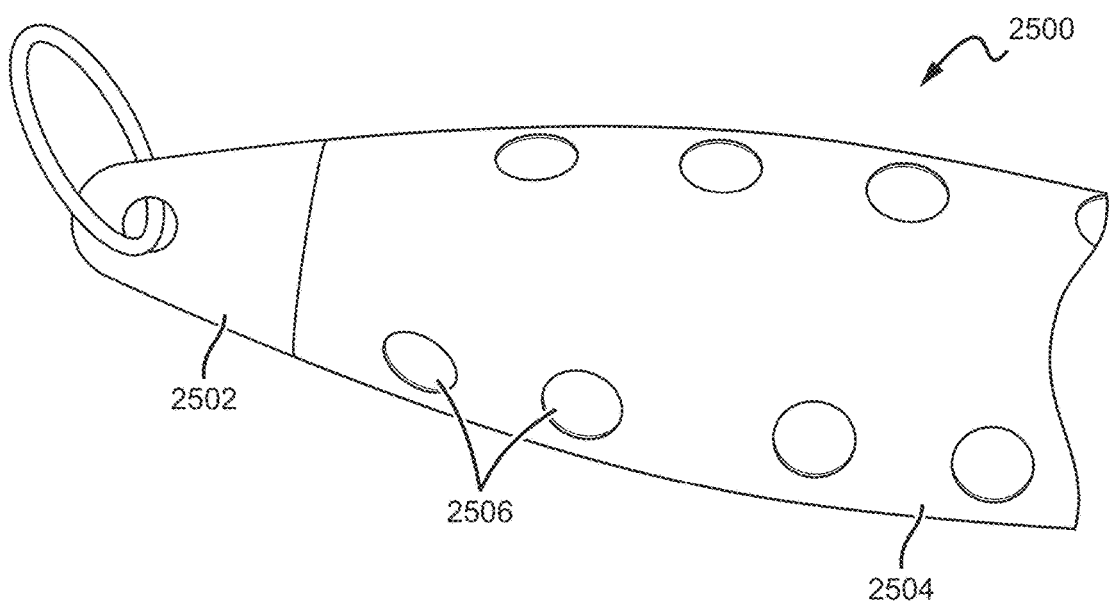
FIG. 25b is a close up view of a portion of a custom lure according to the present disclosure.

FIGS. 25*a*, 25*b* show another embodiment of a custom lure 2500 according to the present disclosure. This particular embodiment comprises a shiny lure body 2502 and a transparent cover 2504 with holes 2506 cut in it to create a textured pattern.

Figure 26:
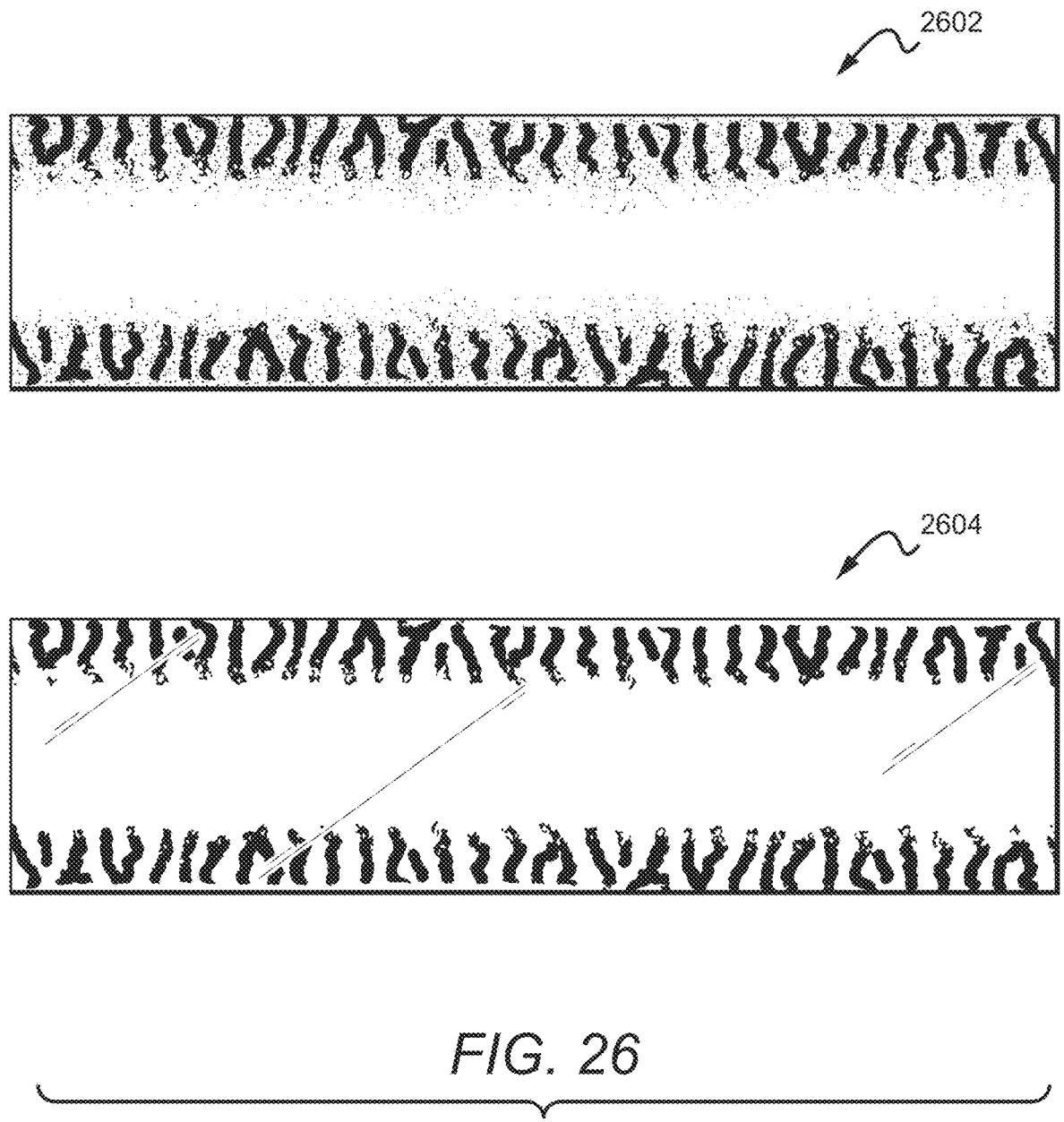
FIG. 26 is a top plan view of two custom lure covers according to the present disclosure.

FIG. 26 shows two similar lure covers 2602, 2604. The lure cover 2604 has been coated with a substance that fluoresces or glows in the presence of ultraviolet (UV) light. Lure covers bearing these substances may exhibit improved visibility to game fish, especially those species that are sensitive to light on the violet end of the visual spectrum and beyond. Such UV coatings can be applied to a cover before or after application to a body.

Figures 27A, 27B:
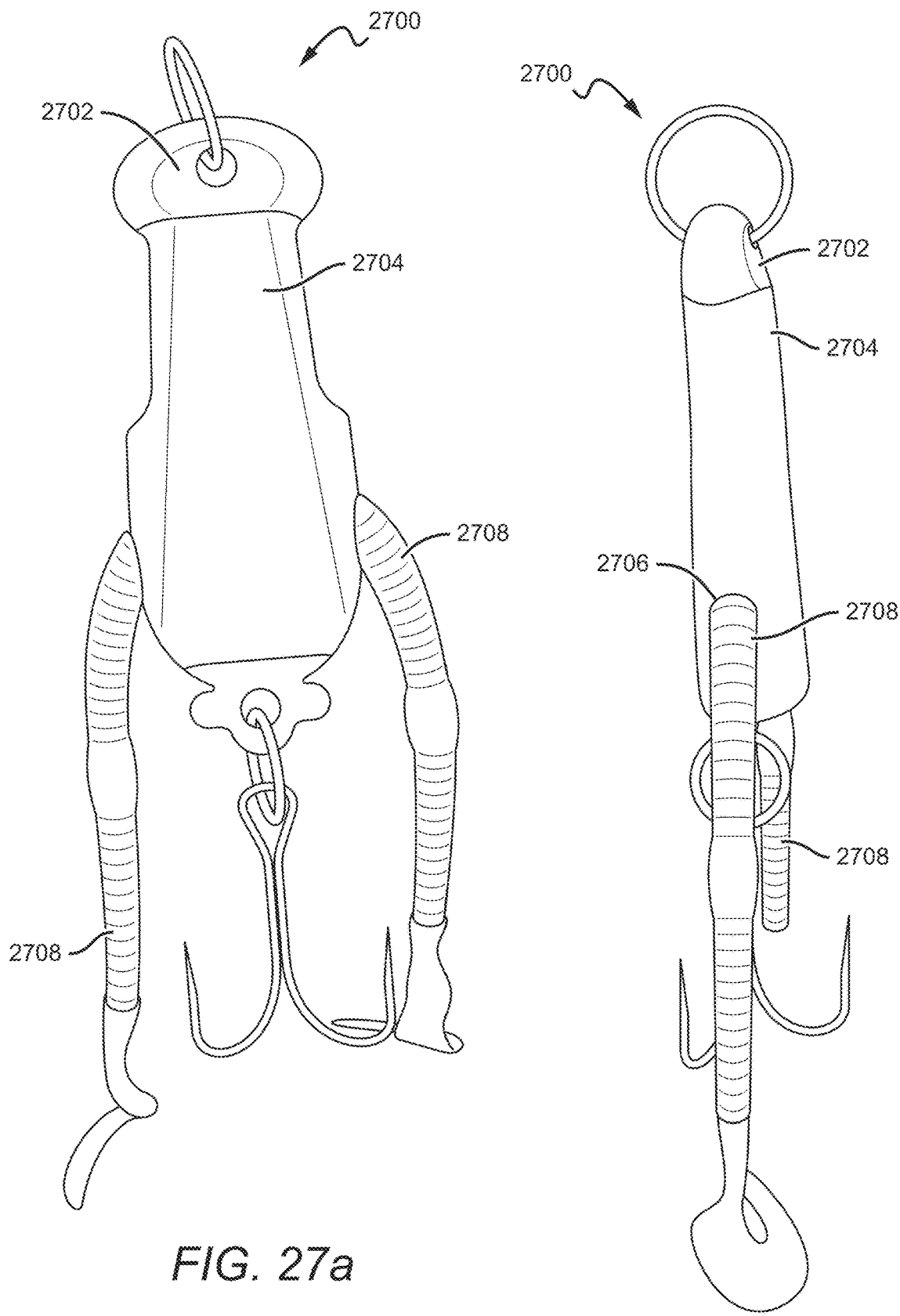
FIG. 27a is a top plan view of a custom lure according to the present disclosure.
FIG. 27b is a right side elevation view of a custom lure according to the present disclosure.

FIGS. 27*a*, 27*b* show another embodiment of a custom lure 2700 according to the present disclosure. This particular embodiment comprises a flattened body 2702, a cover 2704 with two lateral holes 2706, and tentacle attachments 2708. Here, the tentacle attachments 2708 may be fed through the cover 2704 and pressed in place against the lure body 2702 prior to shrinking the lure cover 2704 onto the body 2702. This embodiment is designed to mimic a cephalopod (e.g., a squid) or a crustacean (e.g., a lobster).

Figure 28:
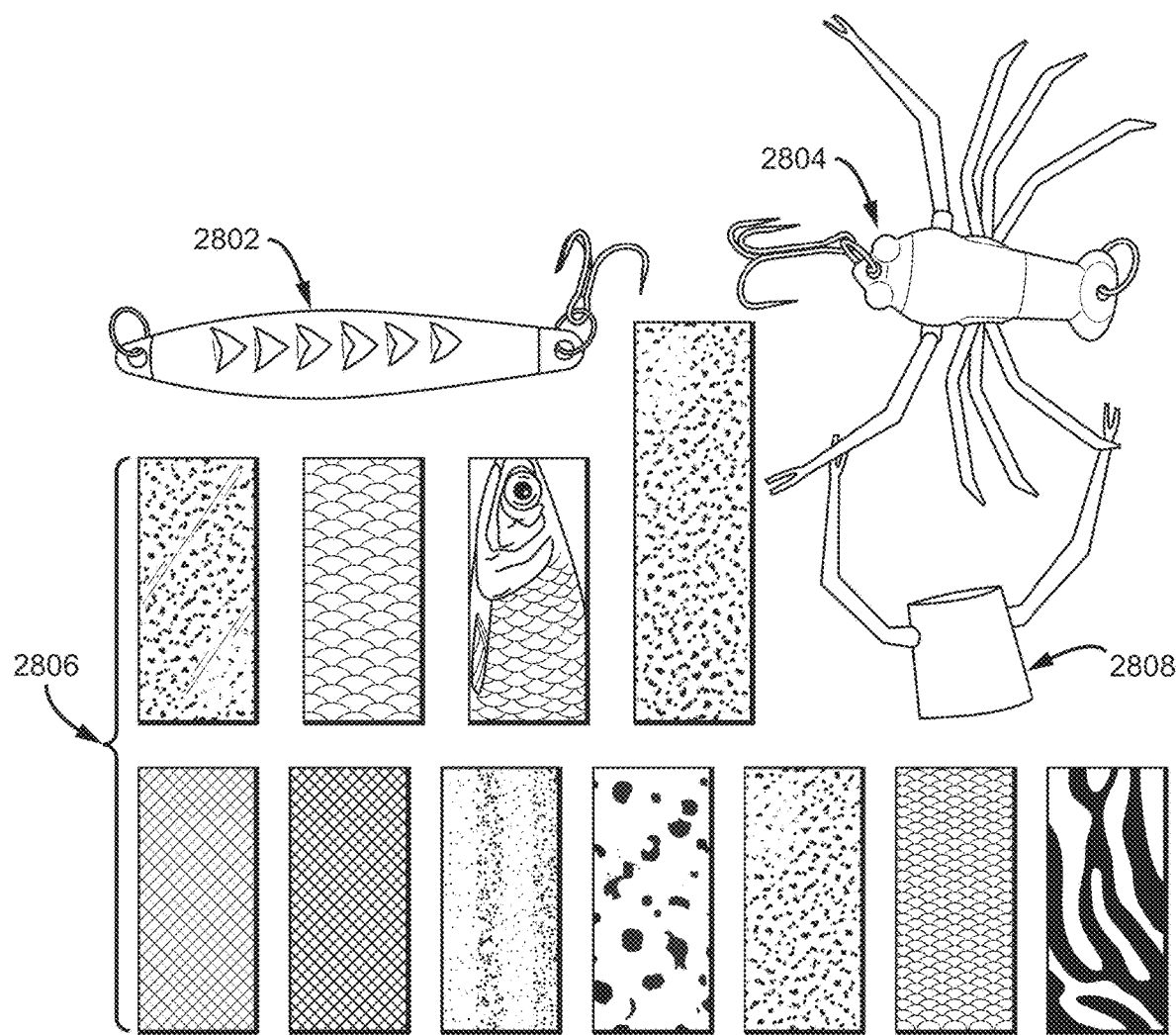
FIG. 28 is a top plan view of custom lures and components according to the present disclosure.

FIG. 28 shows various embodiments of custom lures 2802, 2804, lure covers 2806, and additional attachments 2808 according to the present disclosure.

Figure 29:
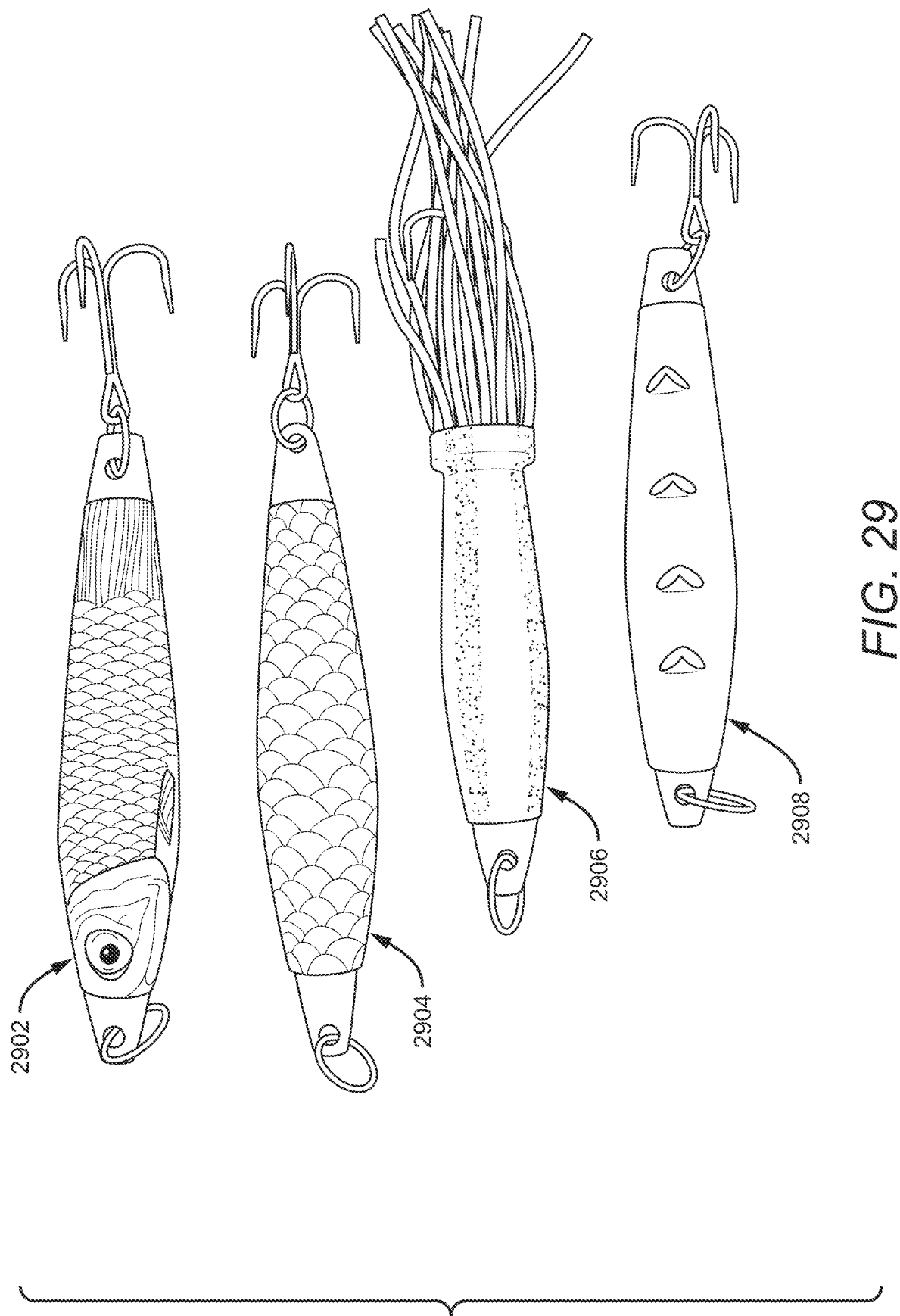
FIG. 29 is a top plan view of custom lures according to the present disclosure.

FIG. 29 shows various embodiments of custom lures 2902, 2904, 2906, 2908 according to the present disclosure.

Figure 30:
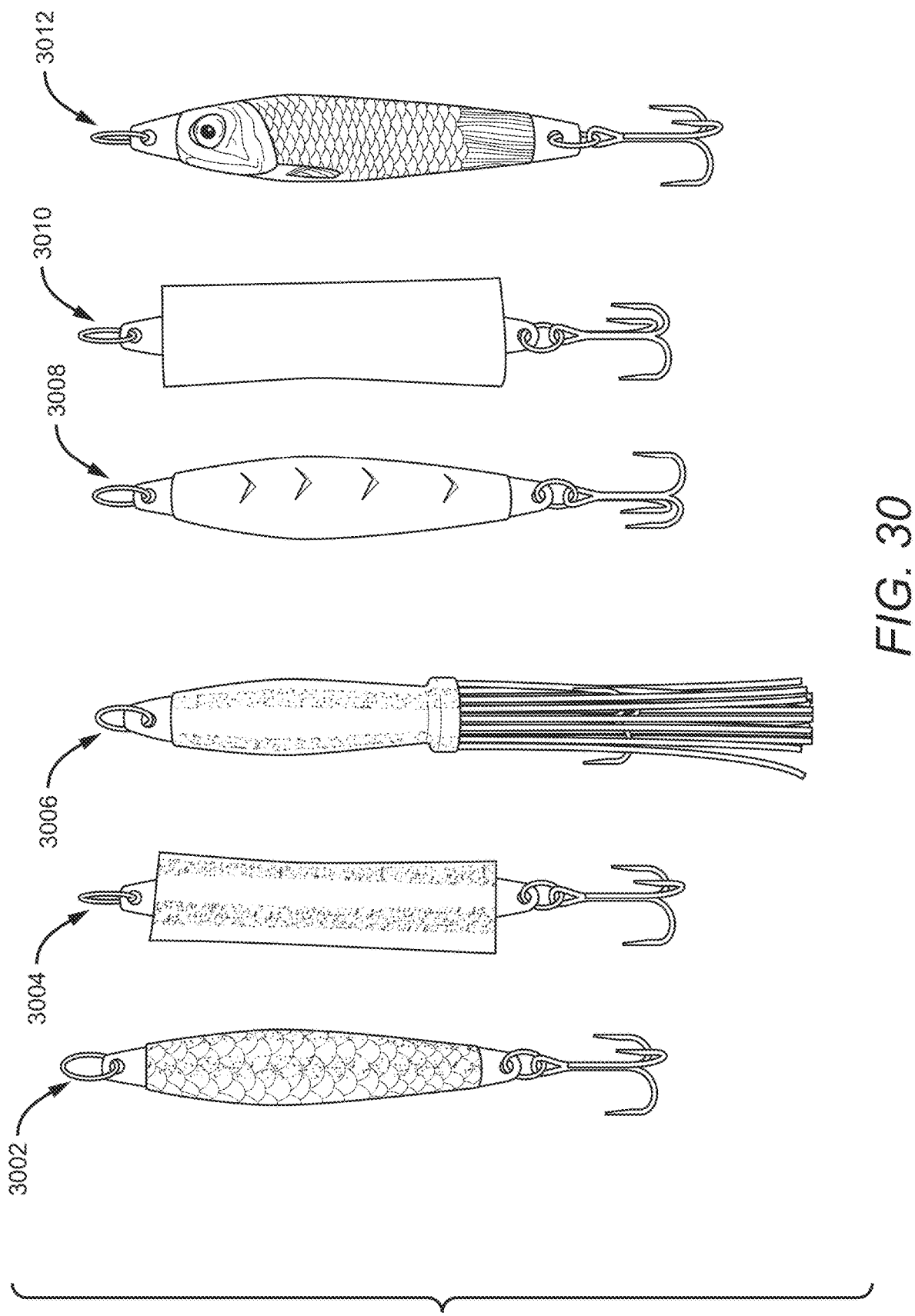
FIG. 30 is a top elevation view of custom lures according to the present disclosure.

FIG. 30 shows various embodiments of custom lures 3002, 3004, 3006, 3008, 3010, 3012 according to the present disclosure in various stages of production.

Figure 31:
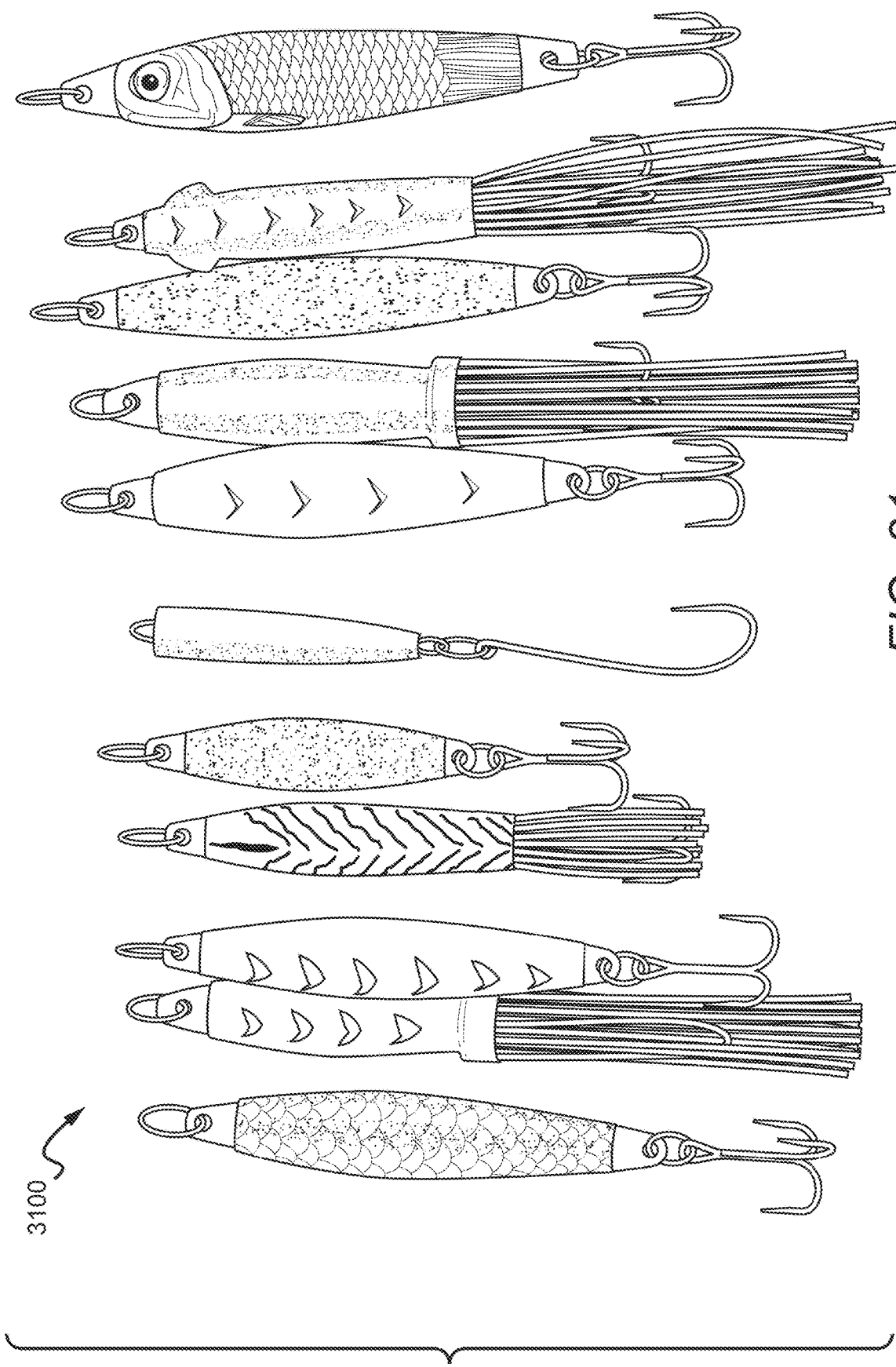
FIG. 31 is a top elevation view of custom lures according to the present disclosure.

FIG. 31 shows embodiments of custom lures 3100 of various shapes and sizes and having various features according to the present disclosure.

It is understood that embodiments presented herein are meant to be exemplary. Embodiments of the present disclosure can comprise any combination or compatible features shown in the various figures, and these embodiments should not be limited to those expressly illustrated and discussed.

Although the present disclosure has been described in detail with reference to certain configurations thereof, other versions are possible. Therefore, the spirit and scope of the disclosure should not be limited to the versions described above. The foregoing is intended to cover all modifications and alternative constructions falling within the spirit and scope of the disclosure as expressed in the appended claims, wherein no portion of the disclosure is intended, expressly or implicitly, to be dedicated to the public domain if not set forth in the claims.

I claim:

1. A fishing lure, comprising:
   a body;
   a removable cover which substantially conforms to the body; and a tail skirt around the body, said tail skirt comprising a generally rectangular shape when detached from the body and a plurality of slits that define fringes in the tail skirt, wherein a portion of the tail skirt is interposed between the body and the cover such that the tail skirt is held in place against the body by the cover.

2. The fishing lure of claim 1 further comprising at least one slit in the cover.

3. The fishing lure of claim 2, wherein the at least one slit is defined by a v-shaped cut in the cover.

4. The fishing lure of claim 1, further comprising tentacle structures attached to the body and protruding through the cover such that the lure mimics a cephalopod.

5. The fishing lure of claim 1, wherein the cover comprises a single continuous piece of material.

6. The fishing lure of claim 1, wherein the cover comprises specular reflective features.

7. The fishing lure of claim 1, wherein the cover comprises diffuse reflective features.

8. The fishing lure of claim 1, wherein the cover comprises a combination of specular reflective features and diffuse reflective features.

9. The fishing lure of claim 1, wherein the cover comprises features that fluoresce in the presence of ultraviolet (UV) light.

10. The fishing lure of claim 1, wherein the body comprises first and second components that are joined together, the cover covering the joint seam between the first and second components.

11. The fishing lure of claim 10, wherein the first component is more rigid than the second component.

12. A kit for making custom fishing lures, comprising:
a body;
a removable cover which substantially conforms to the body;
a heat source; and
at least one additional component chosen from the list consisting of:
a tail skirt around the body, said tail skirt comprising a generally rectangular shape when detached from the body and a plurality of slits that define fringes in the tail skirt, wherein a portion of the tail skirt is interposed between the body and the cover such that the tail skirt is held in place against the body by the cover;
a scent pad on the body, wherein the scent pad is interposed between the body and the cover such that the scent pad is held in place against the body by the cover, and wherein the cover comprises at least one hole exposing a surface of the scent pad; and
a contour structure comprising at least one foam pad positioned on the body to mimic features of a bait fish when the cover is on body, wherein said contour structure is interposed between the body and the cover such that the contour structure is held in place against the body by the cover.

13. The kit of claim 12, further comprising at least one slit in said cover.

14. A fishing lure, comprising:
a body;
a removable cover which substantially conforms to the body; and
a scent pad on the body, wherein the scent pad is interposed between the body and the cover such that the scent pad is held in place against the body by the cover, and wherein the cover comprises at least one hole exposing a surface of the scent pad.

15. The fishing lure of claim 14, further comprising tentacle structures attached to the body and protruding through the cover such that the lure mimics a cephalopod.

16. The fishing lure of claim 14, further comprising at least one slit in said cover.

17. A fishing lure, comprising:
a body;
a removable cover which substantially conforms to the body; and
a contour structure comprising at least one foam pad positioned on the body to mimic features of a bait fish when the cover is on body, wherein said contour structure is interposed between the body and the cover such that the contour structure is held in place against the body by the cover.

18. The fishing lure of claim 17, wherein the contour structure comprises a plurality of pads that mimic gill structures such that the lure resembles a bait fish.

19. The fishing lure of claim 17, further comprising tentacle structures attached to the body and protruding through the cover such that the lure mimics a cephalopod.

20. The fishing lure of claim 17, further comprising at least one slit in the cover.

* * * * *